US011693112B2

(12) United States Patent
Jones et al.

(10) Patent No.: US 11,693,112 B2
(45) Date of Patent: Jul. 4, 2023

(54) RADIO OR SONIC WAVE DETECTOR, TRANSMITTER, RECEIVER AND METHOD THEREOF

(71) Applicants: Government of the United States, as represented by the Secretary of the Air Force, Wright-Patterson AFB, OH (US); The Secretary of State for Defense, as represented by the Defense Science Technology Laboratory, Salisbury (GB)

(72) Inventors: Aaron M Jones, Dayton, OH (US); Richard Walkerdine, Salisbury (GB); Joseph Spencer, Southampton (GB)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1012 days.

(21) Appl. No.: 16/288,791

(22) Filed: Feb. 28, 2019

(65) Prior Publication Data

US 2019/0265353 A1  Aug. 29, 2019

(51) Int. Cl.
G01S 15/89 (2006.01)
G01S 13/04 (2006.01)
(Continued)

(52) U.S. Cl.
CPC ............ G01S 15/8915 (2013.01); G01S 7/35 (2013.01); G01S 13/04 (2013.01); G01S 13/32 (2013.01);
(Continued)

(58) Field of Classification Search
None
See application file for complete search history.

(56) References Cited

U.S. PATENT DOCUMENTS

2006/0152403 A1* 7/2006 Wicks ................. G01S 13/9054
 342/25 R
2015/0293223 A1* 10/2015 Park ...................... G01S 15/892
 367/87

FOREIGN PATENT DOCUMENTS

CN         104977571 A      10/2015

OTHER PUBLICATIONS

M. Secmen, S. Demir, A. Hizal and T. Eker, "Frequency Diverse Array Antenna with Periodic Time Modulated Pattern in Range and Angle," 2007 IEEE Radar Conference, 2007, pp. 427-430, doi: 10.1109/RADAR.2007.374254. (Year: 2007).*

(Continued)

*Primary Examiner* — Isam A Alsomiri
*Assistant Examiner* — Joseph C Fritchman
(74) *Attorney, Agent, or Firm* — AFMCLO/JAZ; Charles R. Figer, Jr.

(57) ABSTRACT

A continuous wave, frequency diverse array (FDA) Detector, Transmitter, Receiver and/or Method are disclosed. The frequencies can be radio waves or sonic waves. Different frequencies are applied to each transmitter element, to generate transmissions schemes with repeating patterns of constructive interference (e.g. each pattern may be a spiral). The patterns differ (e.g. opposite spiral directions to help determine azimuth, or different spiral rotation speeds to help determine range), to a sufficient extent that from the timing of signal reflected back as a result of each one, the azimuth and/or range of an object can be determined, irrespective of where the object/target is in the field of view. Use of continuous wave transmissions enables lower transmission powers and/or avoids requiring an expensive beam-steering transmitters or receivers.

25 Claims, 26 Drawing Sheets

(51) Int. Cl.
- G01S 13/32 (2006.01)
- G01S 7/35 (2006.01)
- G01S 13/42 (2006.01)
- G01S 7/52 (2006.01)

(52) U.S. Cl.
CPC .......... G01S 13/42 (2013.01); G01S 15/8995 (2013.01); *G01S 7/52019* (2013.01); *G01S 7/52085* (2013.01); *G01S 15/8952* (2013.01)

(56) References Cited

OTHER PUBLICATIONS

Jones, Aaron M., "Frequency Diverse Array Receiver Architectures" (2011). Browse all Theses and Dissertations. 525. (Year: 2011).*

W. Wang and H. C. So, "Transmit Subaperturing for Range and Angle Estimation in Frequency Diverse Array Radar," in IEEE Transactions on Signal Processing, vol. 62, No. 8, pp. 2000-2011, Apr. 15, 2014, doi: 10.1109/TSP.2014.2305638. (Year: 2014).*

J. Xu, G. Liao and H. C. So, "Space-Time Adaptive Processing With Vertical Frequency Diverse Array for Range-Ambiguous Clutter Suppression," in IEEE Transactions on Geoscience and Remote Sensing, vol. 54, No. 9, pp. 5352-5364, Sep. 2016, doi: 10.1109/TGRS.2016.2561308. (Year: 2016).*

M. Fartookzadeh and S. H. M. Armaki, "Synthesis of Serial-Fed Frequency Diverse Arrays With Periodic Triangular Frequency-Modulated Continuous Waveform," in IEEE Antennas and Wireless Propagation Letters, vol. 17, No. 2, pp. 263-266, Feb. 2018, (Year: 2018).*

Li, Jingjing, et al., "Identifying unambiguous frequency pattern for target localisation using frequency diverse array," Electronics Letters, IEE Stevenage, GB, col. 53, No. 19 Sep. 14, 2017 (Sep. 14, 2017) pp. 1331-1333.

Antonik, P., et al., "Frequency Diverse Array Radars," IEEE Conference on RADAR, Piscataway, NJ, Apr. 1, 2006, pp. 215-217.

Baizert, P., et al., "Forward-looking radar GMTI benefits using a linear frequency diverse array," Electronics Letters, IEE Stevenage, GB, vol. 42, No. 22, Oct. 26, 2006, pp. 1311-1312.

Xu, Jingwei, et al., "Joint Range and Angle Estimation Using MIMO Radar with Frequecy Diverse Array," IEEE Transactions on Signal Processing, New York, NY, vol. 63, No. 13, Jul. 1, 2016, pp. 3396-3410.

Wang, Wen-qin, et al., "Range-Angle Localization of Targets by a Double-Pulse Frequency Diverse Array Radar," IEEE Journal of Selected Topics in Signal Processing, vol. 8, No. 1, Feb. 1, 2014, pp. 106-114.

Walkerdine, R., et al., "Frequency diverse array offset jitter for range ambiguity resolution," 2018 IEEE Radar Conference, IEEE, Apr. 23, 2018, pp. 1021-1026.

PCT Search Report, PCT/GB2019/000041, dated May 21, 2019.

Combined Search and Examination Report, United Kingdom Intellectual Property Office.

Fartookzadeh et al., "Synthesis of Serial-Fed Frequency Diverse Arrays with Periodic Triangular Frequency-Modulated Continuous Waveform," IEEE Antennas and Wireless Propagation Letters 17, No. 2, pp. 263-264, Feb. 1, 2018.

Gao et al., "Decoupled Frequency Diverse Array Range-Angle-Dependent Beampattern Synthesis using Non-linearly Increasing Frequency Offsets," IET Microwaves, Antennas & Propagation 10, Iss. 8, pp. 880-884, May 19, 2016.

Khan et al., "Frequency Diverse Array Radar With Logarithmically Increasing Frequency Offset," IEEE Antennas and Wireless Propagation Letters 14, pp. 499-502, Nov. 10, 2014.

Fartookzadeh, M., et al., "Synthesis of Serial-Fed Frequency Diverse Arrays with Periodic Triangular Frequency-Modulated Continuous Waveform," IEEE Antennas and Wireless Propagation Letters, vol. 17, No. 2, Feb. 2018.

* cited by examiner

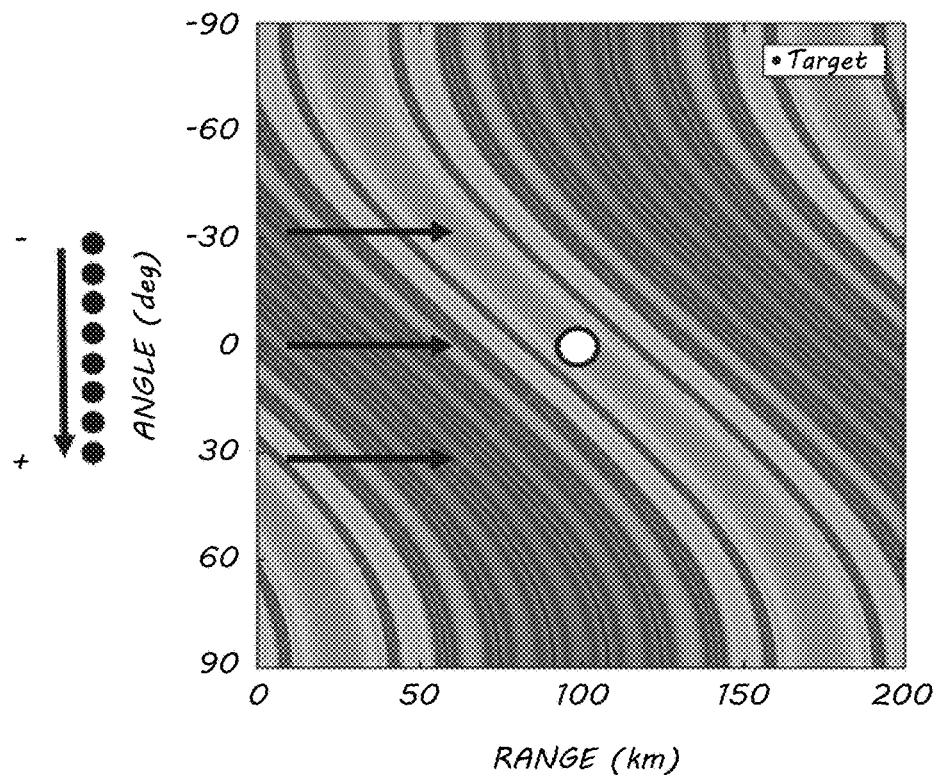
FIG. 1A
PRIOR ART
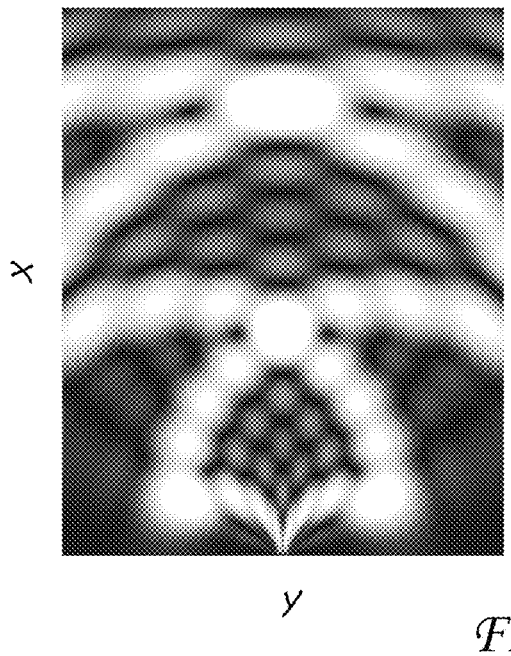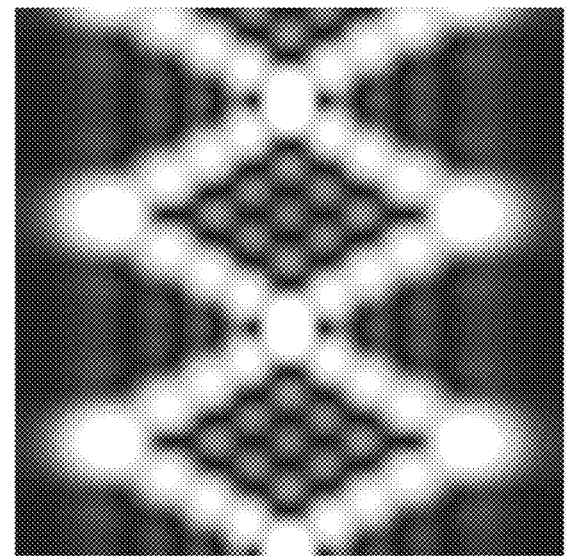
FIG. 1B
PRIOR ART

| ELEMENT | 1 | 2 | 3 | 4 | 5 | 6 | 7 | 8 |
|---|---|---|---|---|---|---|---|---|
| SCHEME 1 | 1 | 1.002 | 1.004 | 1.006 | 1.008 | 1.01 | 1.012 | 1.014 |
| SCHEME 2 | 1 | 1.004 | 1.008 | 1.012 | 1.016 | 1.02 | 1.024 | 1.028 |
| SCHEME 3 | 1 | 1.008 | 1.016 | 1.024 | 1.032 | 1.04 | 1.048 | 1.056 |
| SCHEME 4 | 1.014 | 1.012 | 1.01 | 1.008 | 1.006 | 1.004 | 1.002 | 1 |
| SCHEME 5 | 1.028 | 1.024 | 1.02 | 1.016 | 1.012 | 1.008 | 1.004 | 1 |
| SCHEME 6 | 1.056 | 1.048 | 1.04 | 1.032 | 1.024 | 1.016 | 1.008 | 1 |

|  | | RADAR FOR PORTABLE OR VEHICULAR USE | | |
|---|---|---|---|---|
|  |  | MODE 1 | MODE 2 | MODE 3 |
|  | CARRIER FREQUENCY | 35 GHz (Ka Band) | 25 GHz (K Band) | 9 GHz or 13 GHz (X or Ku Band) |
|  | MEDIUM | AIR | | |
|  | TRANSMISSION VELOCITY | 300,000,000 m/s | | |
|  | MINIMUM SWEEP FREQUENCY | 18 MHz | 6 MHz | 2 MHz |
|  | NOMINAL RANGE | 17 m | 50 m | 150 m |
| LOWER PROCESSING POWER | MAXIMUM SWEEP FREQUENCY | 1800 MHz | 600 MHz | 200 MHx |
| | NOMINAL RANGE RESOLUTION | 0.17 m | 0.50 m | 1.5 m |
| | RANGE:RESOLUTION RATIO | 100 | 100 | 100 |
| HIGHER PROCESSING POWER APPROACH | MAXIMUM SWEEP FREQUENCY | 3600 MHz | 1200 MHz | 400MHz |
| | NOMINAL RANGE RESOLUTION | 8.3 cm | 25 cm | 75 cm |
| | ENHANCED RANGE RESOLUTION | 1.7 cm | 5 cm | 15 cm |
| | RANGE:RESOLUTION RATIO | 200 | 200 | 200 |
| | SWEEP FREQ.:CARRIER FREQ. RATIO | 0.1 | 0.05 | 0.03 or 0.04 |
|  | 3 ELEMENT TRANSMITTER SIZE | 13 mm | 18 mm | 50 or 35 mm |
|  | 8 ELEMENT TRANSMITTER SIZE | 34 mm | 48 mm | 133 or 92 mm |

*FIG. 15A*

|  | RADAR FOR PORTABLE OR VEHICULAR USE | | | |
| --- | --- | --- | --- | --- |
|  | MODE 4 | MODE 5 | MODE 6 | MODE 7 |
| CARRIER FREQUENCY | 5.47 GHz (e.g. 5.47 to 5.725 GHz unlicensed band) | | | |
| MEDIUM | AIR | | | |
| TRANSMISSION VELOCITY | 300,000,000 m/s | | | |
| MINIMUM SWEEP FREQUENCY | 0.5 MHz | 0.125MHz | 31250Hz | 7813 Hz |
| NOMINAL RANGE | 600 m | 2.4 km | 9.6 km | 38 km |
| MAXIMUM SWEEP FREQUENCY | 50 MHz | 12.5 MHz | 3.125MHz | 781250Hz |
| NOMINAL RANGE RESOLUTION | 6 m | 24 m | 96 m | 384 m |
| RANGE:RESOLUTION RATIO | 100 | 100 | 100 | 100 |
| MAXIMUM SWEEP FREQUENCY | 255 MHz | 62.5 MHz | 15.6 MHz | 3.9 MHz |
| NOMINAL RANGE RESOLUTION | 1.2 cm | 5 m | 19 m | 77 m |
| ENHANCED RANGE RESOLUTION | 0.2 m | 1 m | 4 m | 15 m |
| RANGE:RESOLUTION RATIO | 510 | 500 | 500 | 200 |
| SWEEP FREQ.:CARRIER FREQ. RATIO | 0.05 | 0.01 | < 1% | < 1% |
| 3 ELEMENT TRANSMITTER SIZE | 82 mm | | | |
| 8 ELEMENT TRANSMITTER SIZE | 219 mm | | | |

*FIG. 15B*

|  | RADAR FOR PORTABLE OR VEHICULAR USE | | |
|---|---|---|---|
|  | MODE 8 | MODE 9 | MODE 10 |
| CARRIER FREQUENCY | 5.47 GHz (e.g. 5.47 to 5.725 GHz unlicensed band) | | |
| MEDIUM | AIR | | |
| TRANSMISSION VELOCITY | 300,000,000 m/s | | |
| MINIMUM SWEEP FREQUENCY | 1953 Hz | 488 Hz | 122 Hz |
| NOMINAL RANGE | 154 km | 614 km | 246 km |
| MAXIMUM SWEEP FREQUENCY | 195313 Hz | 48828 Hz | 12207 Hz |
| NOMINAL RANGE RESOLUTION | 1536 m | 6.1 km | 24.5 km |
| RANGE:RESOLUTION RATIO | 100 | 100 | 100 |
| MAXIMUM SWEEP FREQUENCY | 976563 Hz | 244141 Hz | 61035 Hz |
| NOMINAL RANGE RESOLUTION | 307 m | 1229 m | 4915 m |
| ENHANCED RANGE RESOLUTION | 61 m | 246 m | 983 m |
| RANGE:RESOLUTION RATIO | 500 | 500 | 500 |
| SWEEP FREQ.:CARRIER FREQ. RATIO | < 1% | < 1% | < 1% |
| 3 ELEMENT TRANSMITTER SIZE | 82 mm | | |
| 8 ELEMENT TRANSMITTER SIZE | 219 mm | | |

FIG. 15C

|  | | 2.4-2.48 GHz Band Radar | Over the Horizon Radar |
|---|---|---|---|
|  | CARRIER FREQUENCY | 2.4 GHz | 30 MHz |
|  | MEDIUM | AIR | |
|  | TRANSMISSION VELOCITY | 300,000,000 m/s | |
|  | MINIMUM SWEEP FREQUENCY | 160000 Hz | 5000 Hz |
|  | NOMINAL RANGE | 1.875 km | 60 km |
| LOWER PROCESSING POWER | MAXIMUM SWEEP FREQUENCY | 16 MHz | 0.5 MHz |
| | NOMINAL RANGE RESOLUTION | 19 m | 600 m |
| | RANGE:RESOLUTION RATIO | 100 | 100 |
| HIGHER PROCESSING POWER APPROACH | MAXIMUM SWEEP FREQUENCY | 80 MHz | 2.5 MHz |
| | NOMINAL RANGE RESOLUTION | 3.8 m | 120 m |
| | ENHANCED RANGE RESOLUTION | 0.8 m | 24 m |
| | RANGE:RESOLUTION RATIO | 500 | 500 |
| | SWEEP FREQ.:CARRIER FREQ. RATIO | 0.03 | 0.08 |
|  | 3 ELEMENT TRANSMITTER SIZE | 165 mm | 15 m |
|  | 8 ELEMENT TRANSMITTER SIZE | 439 mm | 40 m |

*FIG. 16A*

|  | Sensors Using Sonic Wave Energy | | |
|---|---|---|---|
|  | Engineering Ultrasound | Underground Sensor | Active Seismic Sensor |
| CARRIER FREQUENCY | 10 MHz | 20,000 Hz | 5,000 Hz |
| MEDIUM | SOLID (e.g. steel) | GROUND (e.g.rock) | |
| TRANSMISSION VELOCITY | 6000 m/s | 4000 m/s | 4000 m/s |
| MINIMUM SWEEP FREQUENCY | 4000 Hz | 50 Hz | 1 Hz |
| NOMINAL RANGE | 1.5 m | 80 m | 4 km |
| MAXIMUM SWEEP FREQUENCY | 200000 Hz | 1000 Hz | 50 Hz |
| NOMINAL RANGE RESOLUTION | 0.030 m | 4 m | 80 m |
| RANGE:RESOLUTION RATIO | 50 | 20 | 50 |
| MAXIMUM SWEEP FREQUENCY | 1 MHz | 2000 Hz | 500 Hz |
| NOMINAL RANGE RESOLUTION | 0.6 cm | 2.0 m | 8 m |
| ENHANCED RANGE RESOLUTION | 0.1 cm | 0.4 m | 2 m |
| RANGE:RESOLUTION RATIO | 250 | 40 | 500 |
| SWEEP FREQ.:CARRIER FREQ. RATIO | 0.1 | 0.1 | 0.1 |
| 3 ELEMENT TRANSMITTER SIZE | 0.9 mm | 30 mm | 1200 mm |
| 8 ELEMENT TRANSMITTER SIZE | 2.4 mm | 800 mm | 3200 mm |

FIG. 16B

|  | Sensors Using Sonic Wave Energy ||
|  | Room Navigation Sensor | Medical Ultrasound |
| --- | --- | --- |
| CARRIER FREQUENCY | 2.4 GHz | 30 MHz |
| MEDIUM | AIR | WATER |
| TRANSMISSION VELOCITY | 300 m/s | 1500 m/s |
| MINIMUM SWEEP FREQUENCY | 30 Hz | 1000 Hz |
| NOMINAL RANGE | 10 m | 1.5 m |
| MAXIMUM SWEEP FREQUENCY | 1500 Hz | 100000 Hz |
| NOMINAL RANGE RESOLUTION | 0.2 m | 0.02 m |
| RANGE:RESOLUTION RATIO | 50 | 100 |
| MAXIMUM SWEEP FREQUENCY | 7500 Hz | 0.5 MHz |
| NOMINAL RANGE RESOLUTION | 4 cm | 0.3 cm |
| ENHANCED RANGE RESOLUTION | 1 cm | 0.06 cm |
| RANGE:RESOLUTION RATIO | 250 | 500 |
| SWEEP FREQ.:CARRIER FREQ. RATIO | 0.09 | 0.1 |
| 3 ELEMENT TRANSMITTER SIZE | 6 mm | 0.5 mm |
| 8 ELEMENT TRANSMITTER SIZE | 15 mm | 1.2 mm |

*FIG. 16C*

RADIO OR SONIC WAVE DETECTOR, TRANSMITTER, RECEIVER AND METHOD THEREOF

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application claims, under 35 U.S.C. § 119(b), the benefit of and priority to United Kingdom Application Serial No. GB1803239.1, entitled "A Radio or Sonic Wave Detector, Transmitter, Receiver and Method Thereof," filed on Feb. 28, 2018, the entirety of which is incorporated by reference herein.

BACKGROUND OF THE INVENTION

Field of the Invention

The present invention relates to detection of objects using detectors including radar detectors (including from low radio frequencies to terahertz frequencies), and to sonic (including from subsonic to ultrasonic) detectors.

Description of the Related Art

The most common methods of radar involve steering a beam of radio wave pulses in a particular direction, receiving reflections back in a steerable receiver (mechanical or digital), and using the time of flight to determine the distance of the object, the steering direction to determine its azimuth angle, and any frequency shift to measure Doppler (relative velocity) in the radial direction (range). Steering the receiver requires a steerable dish antenna, or a digitally steered phased array antenna.

Continuous Wave Frequency Diverse Array (CW-FDA) Radar devices are a relatively new innovation, involving an array of antenna elements, but with continuous wave signals (as opposed to pulses) of different frequencies applied to each antenna element. A CW-FDA array is normally un-steered, and thus can be a useful additional component of a larger radar system; however, proposed uses for it, have so far been very limited. It is also possible to create a Continuous Wave Frequency Diverse Array (CW-FDA) sonic device, but similarly, proposed uses so far are very limited.

To date, the literature relating to FDA radars has mentioned either only transmit arrays or receiver architectures that reject or exclude the return signals from frequencies other than what was transmitted from that element.

Accordingly, there is a need in the art to provide an improved detector, to provide an improved method of determining at least the unambiguous angle (in either one or two dimensions) or range (and ideally both) of a reflective object.

SUMMARY OF THE INVENTION

Embodiments of the invention address the need in the art by providing a continuous wave radio or sonic frequency diverse array (CW-FDA) detector for determining an unambiguous azimuth or range of a reflective object within a range and field of view of interest. The CW-FDA detector includes a continuous wave radio or sonic frequency diverse array (CW-FDA) transmitter, having a frequency generator; and an array of transmitter elements.

The CW-FDA transmitter may be configured to operate according to a first transmission scheme. In this scheme, the frequency generator may be configured to provide at least two transmitter elements of the array of transmitter elements with signals of respectively different frequency. A spacing of the at least two transmitter elements and the frequencies provided thereto are such as to generate a first transmission pattern. The first transmission pattern exhibits a deterministic pattern of constructive interference repeating in range, where the differing frequency signals are of a substantially continuous wave. Additionally, within each repeat in the range, the pattern include areas of constructed interference distributed in azimuth or range, such that a timing of returned signals results from reflection of the transmission pattern by the reflective object provides a constraint on possible values of the azimuth or the range.

The CW-FDA transmitter may be further configured to operate according to a second transmission scheme, where the second transmission scheme generates a second transmission pattern, which is different from the first transmission pattern. The first and second transmission patterns exhibit sufficient spatial diversity of constructive interference compared to the other of the first and second transmission patterns.

The CW-FDA detector further includes a continuous wave radio or sonic frequency diverse array (CW-FDA) receiver having a receiver configured to receive returned signals reflected from the reflective object resulting from a transmission by the CW-FDA transmitter across at least part of the field of view of interest. The receiver, in some embodiments, may also include a computing device configured to receive returned signal data from the CW-FDA receiver.

The CW-FDA receiver is configured to receive signals of the first and second transmission patterns, each signal resulting from each of the first and second transmission patterns having at least one distinguishing feature to enable attribution to its respective transmission pattern. A timing of attributable returned signals enables unambiguous determination of the azimuth or range of the reflective object, and the computing device is configured to attribute each received signal to its respective transmission pattern based on the distinguishing features. The computing device is further configured to unambiguously determine azimuth or range of the reflective object based at least on the timing of the attributed returned signals.

Additional objects, advantages, and novel features of the invention will be set forth in part in the description, which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1A is an illustration of the propagation of a main lobe and side lobes from a frequency diverse array (FDA) Radar of the Prior Art (arrows show propagation direction);

FIG. 1B is an illustration of the propagation of a transmission from an FDA radar of a Prior Art method showing one single (albeit more complex) transmission pattern, involving two opposite spirals in the same frequency band, with the same repeat frequency, and being transmitted in the same transmission scheme;

FIGS. 15A-15C contain a table with 10 example CW-FDA detector embodiments, showing a selection of possible choices of a range of transmission schemes with a range of sweep frequencies that are each less than the carrier frequency, and how the range of sweep frequencies may be greater if more processing power is available to compare their resulting received signals, and illustrating the diversity of ranges and range-resolutions that could be achieved, subject to hardware and signal-to-noise ratio limitations;

FIGS. 16A-16C contain a table with 4 example CW-FDA Sonic embodiments, showing some suitable carrier frequencies for different applications, and showing a selection of possible choices of a range of transmission schemes with a range of sweep frequencies that are each less than the carrier frequency, and illustrating the diversity of ranges and range-resolutions that could be achieved, subject to hardware and signal-to-noise ratio limitations;

Figure 2:
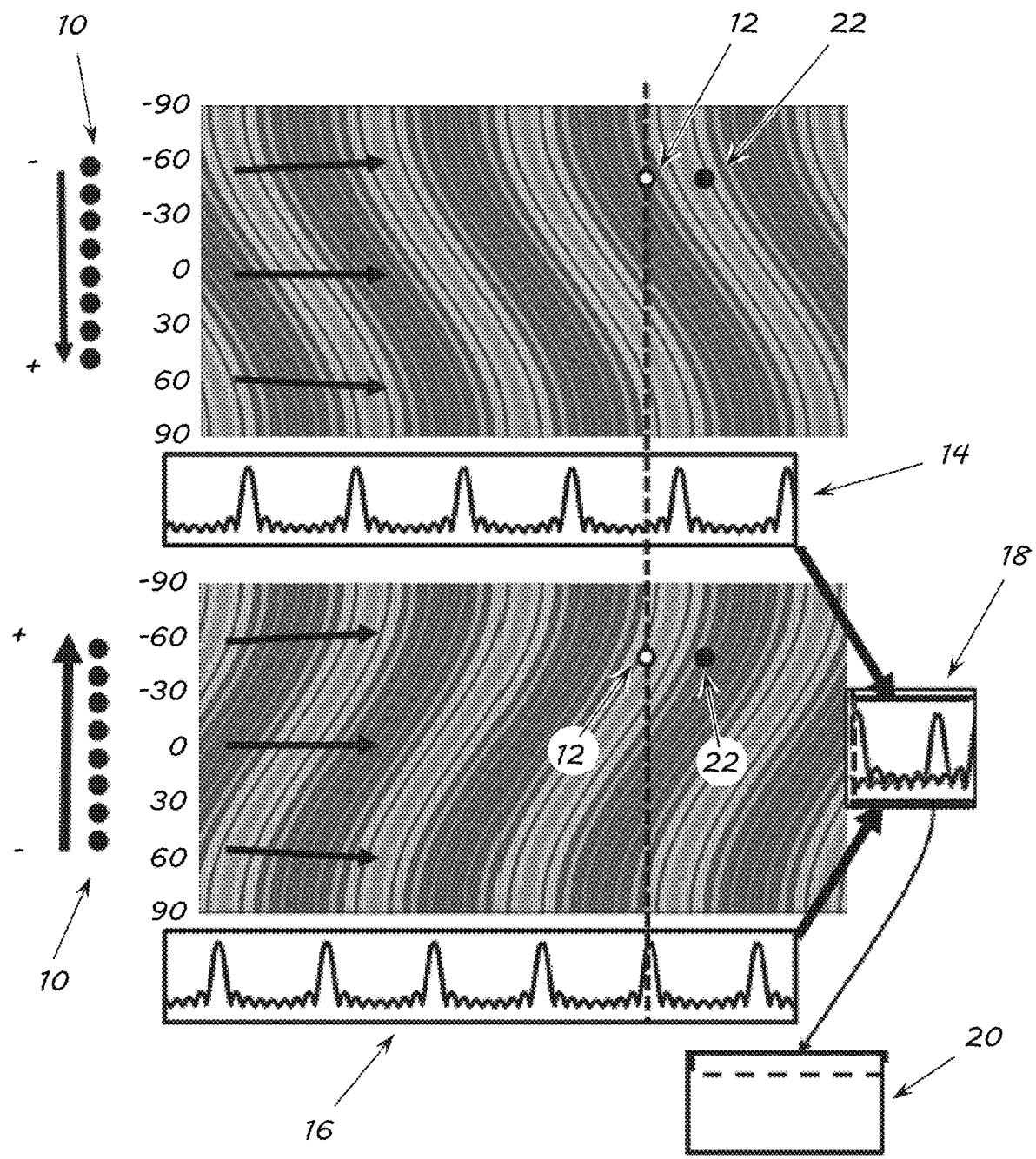
FIG. 2 shows an exemplary embodiment of a CW-FDA detector of an embodiment of the present invention operating according to two transmission schemes that have opposite sweep directions, and illustratively shows returned signals resulting from an object.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

A planar array may be used with frequency offsets along it (or in two dimensions, along both axes) such that a linear increase is witnessed in one or both dimensions. Signal structures described are flexible enough to include other frequency progressions or waveform types. A 4-D pattern snapshot visualization technique allows the complex pattern to be directly compared to the constant frequency (CF) planar array pattern, providing insight into the value of planar CW-FDA. The elements of the planar CW-FDA are assumed to be ideal isotropic radiators and without noise interference. For this analysis, let the array span the X-axis with inter-element spacing $$d_x = \frac{\lambda_{min}}{2},$$

and Y-axis with inter-element spacing $$d_y = \frac{\lambda_{min}}{2},$$

such that the reference element of the array is located at (0; 0; 0), and $\lambda_{min}$ corresponds to the wavelength of the maximum frequency transmitted by the array. In some of the exemplary embodiments, the CW-FDA may transmit a set of linearly increasing frequencies, on the X and Y-axes with step sizes ($\Delta f_x = \Delta f$, $\Delta f_y = (N+1)\Delta f$) respectively, where $|\Delta f|$ is limited in order for the system to be considered narrowband. Doing so, the set is succinctly represented as $f_{nm} = f_c + n\Delta f_x + m\Delta f_y$ for $n=0 \ldots N-1$ and $m=0 \ldots M-1$, where f is the carrier and N and M are the number of elements in the array along the X and Y-axes, respectively. (For example, see FIGS. 10 and 11 for a graphical depiction of this configuration.)

It can be assumed that the radar is operating in continuous wave (CW) mode and that graphics of the patterns are snapshots for fixed time t where $$t \gg \frac{2R}{c},$$

2R is the two-way range, and c is the RF speed of propagation. This assists in framing the approach used to describe and depict time-dependent patterns. However, CW-FDA spatial patterns are periodic in time. In the following receiver architecture discussion, linear frequency progression on either axis is not necessary, but it is preferable to implement complete spectral diversity (meaning that significant repeated frequencies on transmit are avoided) since otherwise an additional method, such as coding, would be necessary to separate the signals to apply the appropriate beamforming weights. In the following, the transmit and receive signals are developed and simulated using the parameters found below. It provides values for quantifiable parameters such as, the number of elements in the array, the grid limits, grid spacing for the points in space where the signal was calculated and measured, as well as the target location. The simulation parameters used, are as follows:

| Parameter | Value | |
|---|---|---|
| Number X-axis elements: N | 9 | |
| Number Y-axis elements: M | 9 | |
| Element spacing: $d_x$ and $d_y$ | $\lambda_{min}/2$ | |
| Carrier frequency: fc | 10 | GHz |
| X-axis frequency offset: $\Delta_{fx}$ | 1 | kHz |
| Y-axis frequency offset: $\Delta_{fy}$ | 1 | kHz |
| X grid limits | [−100; 100] | km |
| X grid spacing | 2 | km |
| Y grid limits | [−100; 100] | km |
| Y grid spacing | 2 | km |
| Z grid limits | [0; 200] | km |
| Z grid spacing | 2 | km |
| target X location: $x_0$ | 0 | km |
| target Y location: $y_0$ | 0 | km |
| target Z location: $z_0$ | 100 | km |

Next, a discussion of a complete transmit signal is provided along with a presentation of a closed-form expression of the planar transmit spatial pattern and a graphical depiction of the shape of the main beam spatial pattern. The signal transmitted by the (n;m) emitter is a complex sinusoid given as $$s_{nm}(t) = a_{nm}(t)\exp\{j2\pi f_{nm}t\} \quad (1)$$

The signal when delayed to a target location is $$s_{nm}(t) = a_{nm}\left(t - \frac{R_{nm}}{c}\right)\exp\left\{j2\pi f_{nm}\left(t - \frac{R_{nm}}{c}\right)\right\} \quad (2)$$

where $a_{nm}(t)$ is a complex weighting factor that represents transmission and propagation effects that may be neglected (i.e., $a_{nm}(t)=1\ \forall_{t,n,m}$) for these purposes.

The signal maybe be measured for a target at $(x_0, y_0, z_0)$ for element locations $(x_n; y_m; 0)$ by setting $R_{nm} = \sqrt{(x_0-x_n)^2+(y_0-y_m)^2+z_0^2}$. Letting the reference point be $(0; 0; 0)$ and making a far-field approximation, we express range as $$R_{nm} \cong R_0 - nd_x \sin\theta_0 \cos\phi_0 - md_y \sin\theta_0 \cos\phi_0 \quad (3)$$

where $R_o = \sqrt{x_0^2 + y_0^2 + z_0^2}$, $\cos\theta_0 = \frac{z_0}{R_0}$, and $\tan\phi_0 = \frac{y_0}{x_0}$ and boresight is measured perpendicular to the reference element along the Z-axis. This allows (2) to be rewritten as $$s_{nm}(t) \cong \exp\left\{ j2\pi f_{nm}\left( t - \frac{R_0}{c} + \frac{nd_x \sin\theta_0 \cos\phi_0}{c} + \frac{md_y \sin\theta_0 \cos\phi_0}{c} \right) \right\} \quad (4)$$

In order to sweep the main lobe on transmit, an additional phase term is necessary that comprises two components (angle and range). The mainlobe may be swept in angle ($\hat{\theta}_0$, $\hat{\phi}_0$) and range $\hat{R}_o$ to yield a composite beam-weighting factor $$\alpha(\hat{R}_0, \hat{\theta}_0, \hat{\phi}_0,) = \quad (5)$$
$$\exp\left\{ j2\pi f_{nm}\left( \frac{\hat{R}_0}{c} - \frac{nd_x \sin\hat{\theta}_0 \cos\hat{\phi}_0}{c} - \frac{md_y \sin\hat{\theta}_0 \cos\hat{\phi}_0}{c} \right) \right\}$$

where $(\hat{\theta}_0, \hat{\phi}_0)$ and $\hat{R}_o$ are relative to the reference element. The transmit signal from a single element as seen by a point target in space is $$s_{nm}(t; \hat{R}_0, \hat{\theta}_0, \hat{\phi}_0) = \alpha(\hat{R}_0, \hat{\theta}_0, \hat{\phi}_0) s_{nm}\left(t - \frac{R_{nm}}{c}\right), = \quad (6)$$
$$\exp\left\{ j2\pi f_{nm}\left( t - \frac{R_0 - \hat{R}_0}{c} + \frac{nd_x(\sin\theta_0 \cos\phi_0 - \sin\hat{\theta}_0 \cos\hat{\phi}_0)}{c} + \frac{md_y(\sin\theta_0 \sin\phi_0 - \sin\hat{\theta}_0 \cos\hat{\phi}_0)}{c} \right) \right\}.$$

Continuing, consider the transmit signal in (6) from each element and sum over all X and Y-axes contributions to give the total observed signal at $(x_0, y_0, z_0)$:

$$s(t; \hat{R}_0, \hat{\theta}_0, \hat{\phi}_0) = \sum_{n=0}^{N-1}\sum_{m=0}^{M-1} \alpha(\hat{R}_0, \hat{\theta}_0, \hat{\phi}_0) s_{nm}\left(t - \frac{R_{nm}}{c}\right), = \sum_{n=0}^{N-1}\sum_{m=0}^{M-1} \exp \quad (7)$$
$$\left\{ j2\pi f_{nm}\left( t - \frac{R_0 - \hat{R}_0}{c} + \frac{nd_x(\sin\theta_0 \cos\phi_0 - \sin\hat{\theta}_0 \cos\hat{\phi}_0)}{c} + \frac{md_y(\sin\theta_0 \sin\phi_0 - \sin\hat{\theta}_0 \cos\hat{\phi}_0)}{c} \right) \right\}.$$

Making a plane wave approximation (target range, $$R \gg \frac{D^2}{4\lambda_{min}},$$

D is largest dimension of aperture) and narrowband assumption (bandwidth $\ll f_c$) a closed-form expression may be derived where $$\omega_x = \pi\Delta f_x, \omega_{0_x} = \frac{\pi d_x}{\lambda_c}, \omega_y = \pi\Delta f_y, \omega_{0_y} = \frac{\pi d_y}{\lambda_c}, \text{ and } \lambda_c = \frac{c}{f_c}.$$

The term $\exp\{j\Phi\}$ contains additional phase factors associated with the geometry of the set-up, but do not necessarily contribute to the structure of the pattern, which is of most importance. It is important to note that by making the narrowband assumption and manipulating the signal into a sinc-like structure, the quadratic phase terms are excluded that manifest when multiplying out the frequency components.

Figure 8:
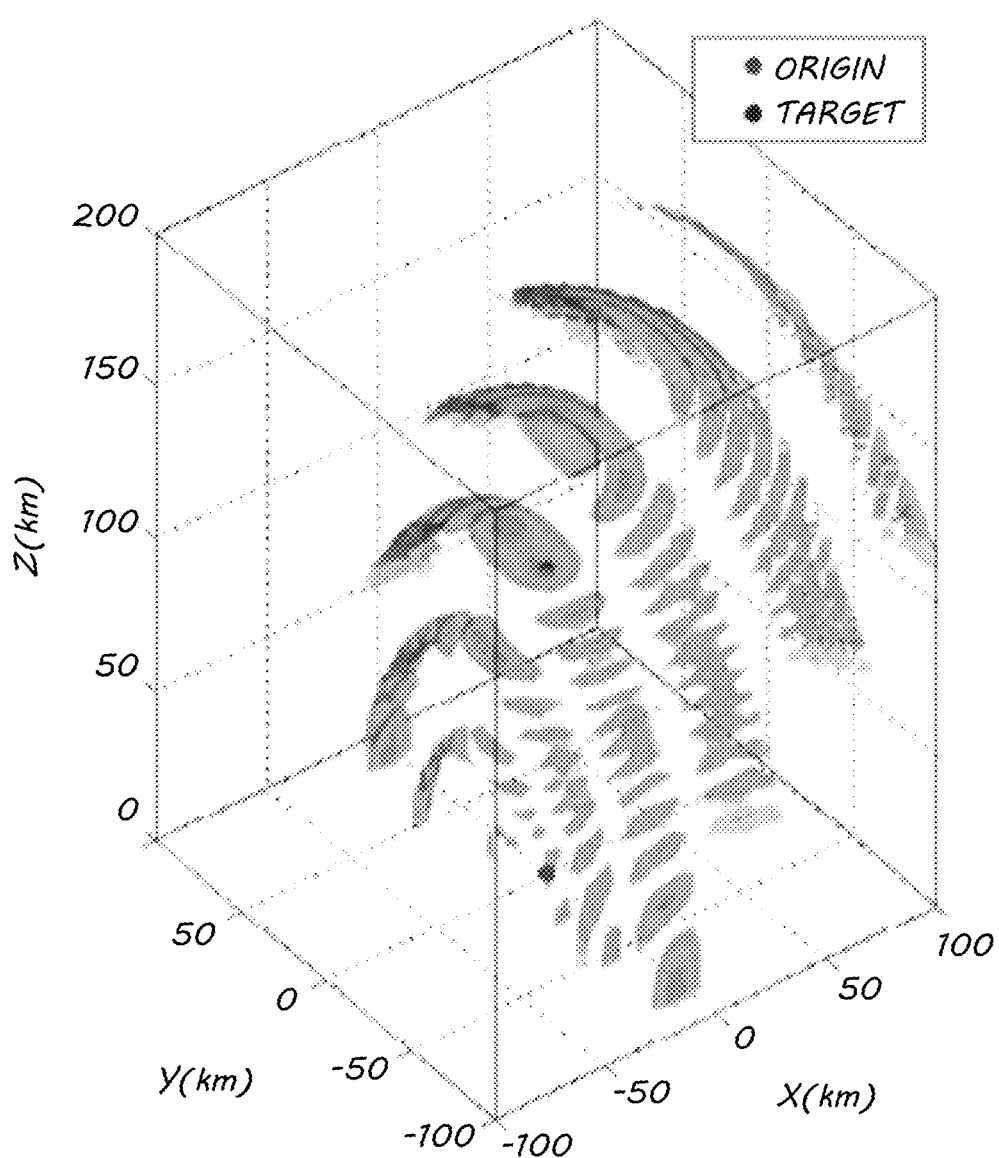
FIG. 8 shows an illustration of a transmit spatial pattern of a CW-FDA transmitter with a 10 dB Beamwidth according to an exemplary embodiment of the present invention, the pattern shows fast angular sweep in a first direction, with slow angular sweep in an orthogonal direction, so as to cover a 2D field of view.
Figure 9A:
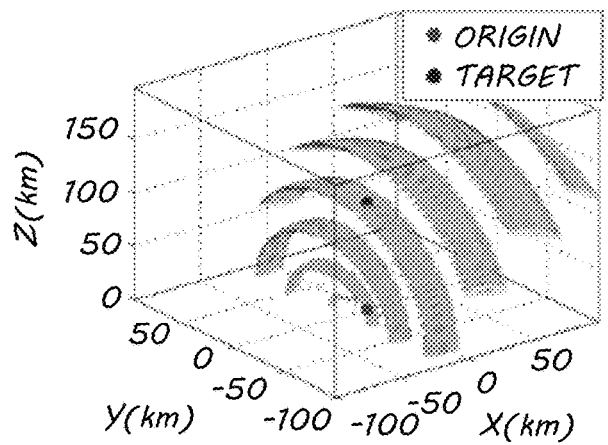
FIGS. 9A-9D show illustrations of transmit spatial patterns of an CW-FDA.
Figure 9B:
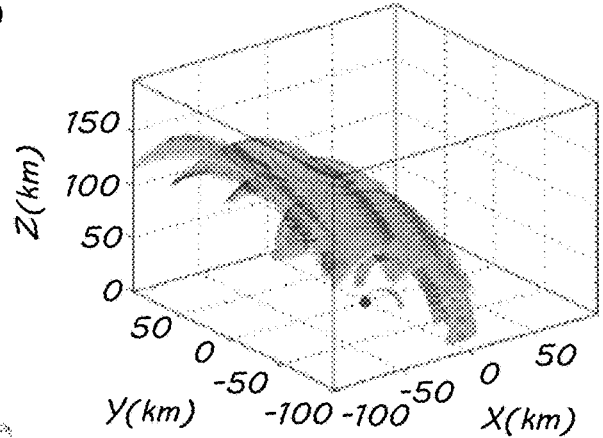
Figure 9C:
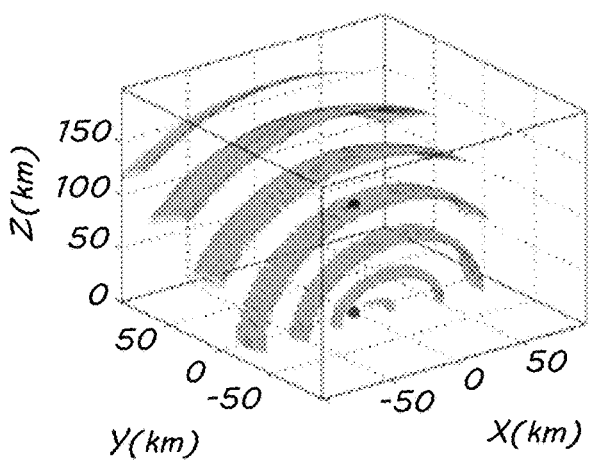
Figure 9D:
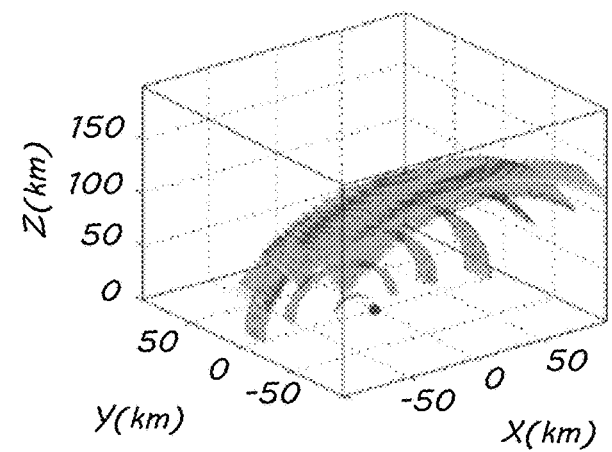

See, for example, FIG. 8, which illustrates the 10-dB mainbeam width. While sidelobes are present, they are greater than 10-dB down from the mainbeam and therefore are not visible in this portrayal.

To get a better feel for the iso-surface presentation, observe the cross section of the CF transmit spatial pattern and notice the concentric rings of varying gradient that represent receding gain values. As expected, the CF pattern does not vary in range but the CW-FDA pattern appears periodic in angle and range in three dimensions. Additionally, patterns of four different offset configurations can be seen, for example, in FIGS. 9A-D.

Notice that even though the offsets can have the same magnitude, the pattern is also dictated by the "direction" of the offset (+;−) and along which axis (X;Y) the offset progresses. Here a single pattern ambiguity is visualized, if the pattern for a larger volume were computed, the periodicity would be evident.

This phenomenon could be a nuisance for the radar designer, but by selecting range fall-off and selective frequency offset choices, as appropriate for a given system, such that the ambiguities are below the minimum discernible signal of the system, the issue can be dispensed with.

The pattern that arises in this exemplary embodiment is one of only a class of patterns that can be used. However, with the additional degree of freedom that has been introduced, 3-D null steering becomes possible, permitting multiple target tracking at different azimuths, elevations and ranges within a single beam, permitting use of a fixed geometry receiving antenna.

The following exemplary embodiment of the invention describes an CW-FDA Radar, however the same design could be implemented as an CW-FDA Sonic Detector, by replacing the radar transmitting elements with sonic transmitting elements, and by replacing the radar receiver antenna with an sonic receiver (a sonic detector, generally a microphone), and selecting a carrier wave frequency band suited to acoustic sonic signal propagation and detection, rather than a carrier wave band frequency suited to radar signal propagation.

As it is generally preferable for the transmitter elements to be arranged a half wavelength apart (e.g. based on a center frequency of the frequency band), the desired size of the detector also influences the frequencies used. Since sonic waves (depending on in air, water or ground) may travel 50,000 to 1,000,000 times slower than radar (in air), the range of frequencies most of interest in the sonic domain would be smaller by the same proportion compared to the range of frequencies most of interest in the radar domain.

With both modalities (radar and sonic), a very wide range of frequencies can be usefully selected, depending on the size of detector and range of detection desired. The sweep rate is proportional to how much the frequency of each transmit antenna is different with respect to position- and this is true both in the sonic domain and the radar domain. As a result the following discussion is equally applicable to both domains, and is independent of the carrier frequency used.

FIG. 1A shows a main lobe (thick diagonal and curved lighter band) and side lobes (thinner light bands either side) of a transmission pattern emanating from an FDA Radar transmitter. Arrows show the direction of propagation from the transmitter (8 black circles) on the left. This example has a linear increase in frequency (see downward arrow) applied across a number of equally spaced antenna elements. Unlike a conventional radar transmission pattern, the main lobe does not remain in the forward (0 degrees) direction. Instead the main lobe sweeps upwards from the bottom of FIG. 1A, and then repeats from the bottom. FIG. 1A is thus a snapshot in time of this behavior.

FIG. 1B shows a different prior art FDA transmission pattern. This time the direction of propagation is upwards, and the transmission pattern is displayed in two plots. On the left the transmission pattern is shown in Cartesian coordinates at a particular point in time. On the right the transmission pattern is shown in range vs angle. There are visual similarities between the two plots as they are showing the same information. Use of both types of plots is useful since they help the reader understand the transmission pattern and also help identify sampling artifacts. Sampling artifacts are visible in FIG. 1B as fine horizontal lines in the right hand plot, and as fine curves in the left hand plot. These artifacts should be disregarded.

The transmission pattern in FIG. 1B by itself is not sufficient for implementing the present invention since although two patterns might be identified visually from the plots (namely a clockwise spiral and an counter-clockwise spiral), these patterns lack the required features that would enable a receiver to discriminate which of them a signal it had received was due to. Instead the transmission pattern of FIG. 1B is correctly described as only having one single (albeit more complex) repeating transmission pattern, since the two spirals are provided in one transmission scheme, within the same frequency band, in the same polarization, and at the same time, and the two spirals shapes have the same pulse-width (in range), and importantly—they have the same repeat rate. In addition, in the prior art they are not used or distinguished as separate transmission patterns.

FIG. 2 shows an exemplary embodiment of the present invention. In this embodiment, sequences of transmitter elements 10 are used (lines of black circles on the right) in the first instance with frequency increasing towards the bottom antenna element, and in a second instance with frequency increasing towards the top antenna element. The same sequence of antenna elements may be used in those two transmission schemes, either at different times, or in different frequency bands, or different sequences of antenna elements may be used.

As shown in FIG. 2, a target 12 (white circle) receives a main lobe of the transmission with different timings depending whether the frequencies increase up the antenna elements or downwards. In this example, the frequencies are the same, merely reversed and at an equal rate (a matched pair), however many alternative configurations are also possible.

Each transmission scheme transmits substantially continuous wave frequencies (at least during the period that the spiral sweeps through a field of view of interest to the user—the amplifier may be switched off at other times if desired); however, the reflection from the target has the appearance of a series of pulses, which show the main lobe and side lobe structure of the transmission (see the exemplary wave trains 14, 16 illustrated below the top and bottom images). The timing of the return of these returned signals is different in scheme 1 (top) and scheme 2 (bottom). This is shown illustratively in the graph response vs time 18 on the right. By comparing the timing difference of the two peaks it is possible to ascertain the angle of the object (see box 20 at the bottom showing the determined angle). Ascertaining angle of the object from one such scheme alone is impossible because although the timing of the returns can be measured, this might correspond to a nearby object to the left (for example) but also might correspond to a further away object that is to the right. As can be seen, the reflected response from another target 22 (black circle) would show the same difference in timing in the two transmission schemes, and therefore can be determined to be at the same angle by use of reflections from the two transmission schemes together.

Figure 3:
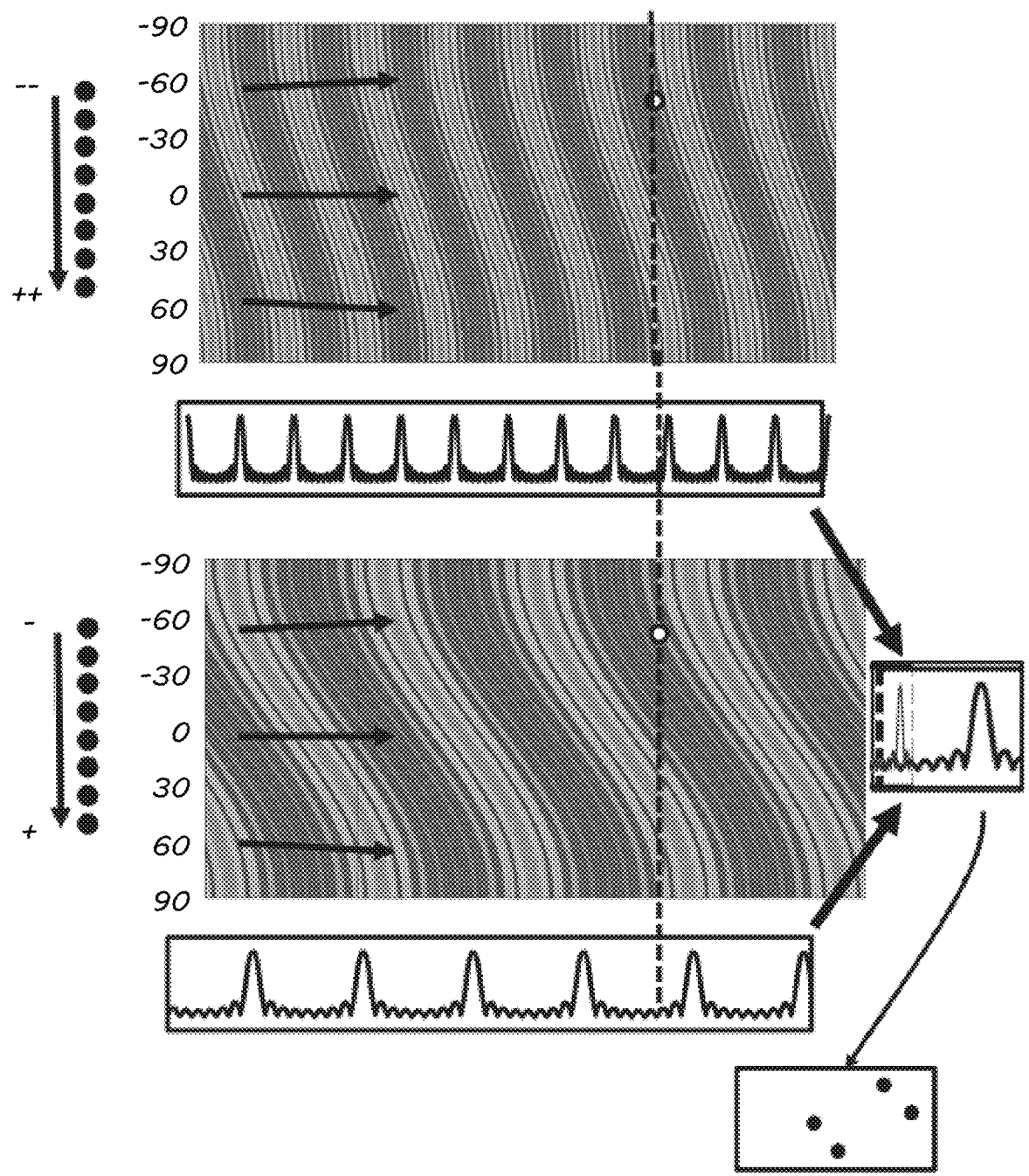
FIG. 3 shows an exemplary embodiment of a CW-FDA detector of an embodiment of the present invention operating according to two transmission schemes that have the same sweep direction but different sweep frequencies, and illustratively shows returned signals resulting from an object.

In FIG. 3, two schemes are again depicted. In this example the second (lower) scheme has a higher sweep frequency (rather than a different sweep direction or a different field of view to sweep across). As can be seen, this narrows down the possible positions of the object, and enables determination that the object is in a subset of the range and angle of the field of view. Two transmission schemes are usually insufficient to identify an angle of an object unless they have equal repeat (sweep) frequencies. Instead one or more additional schemes may be implemented to narrow down the possible locations until only one possible location remains. To distinguish the locations of multiple objects (not shown) additional schemes should be implemented, each having a different sweep path.

Another example (not shown for brevity) would be to arrange scheme 1 sequence of transmitter elements to be differently oriented (by angle $\theta$) to that in scheme 2. Alternatively, the same sequence of transmitter elements could be used, albeit with phase differences applied that would have (at first order approximation) the same effect as moving the antenna elements backwards or forwards, thus having the effect of rotating the sequence of antenna elements. Here, although the details are slightly different, again a difference in timing in returned signals is exhibited between the first and second schemes, enabling the angle of the object to be determined.

Figure 4A:
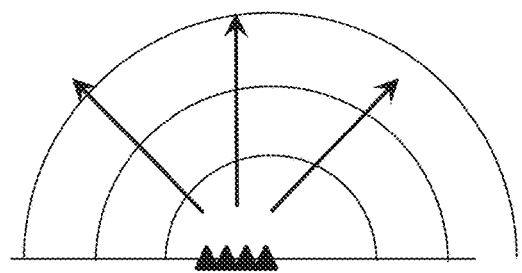
FIGS. 4A-4G are illustrations of exemplary embodiments of the invention, showing the arrangements of main lobes of transmissions of each of one, two or three transmission schemes, at one or more particular points in time, showing how transmission schemes having different paths can be used together to determine the location of an object.
Figure 4H:
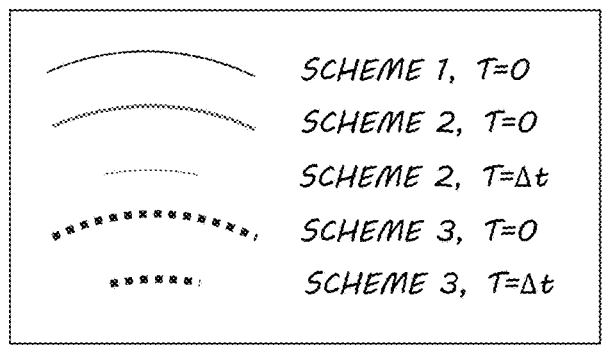
FIG. 4H contains a legend for the illustrations of FIGS. 4A-4G.

Turning now to FIGS. 4A-4H, a number of transmission schemes are depicted in illustrative form. FIG. 4A shows a first transmission scheme, which is also present throughout FIGS. 4B to 4G.

Figure 4B:
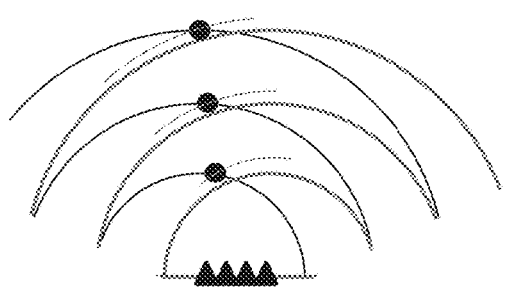

In FIG. 4B, a second transmission scheme (grey spiral) is shown. In this scheme the main lobe (grey arcs) spreads out in curves, which, although the propagation direction (see arrows in FIG. 4A) of the radiation is radial, have a transmission pattern that sweeps across the field of view. At a particular point in time relative to the start of the transmission of the scheme the position of the main lobe of scheme 1 is shown in black arcs, and the position of the main lobe of scheme 2 is shown in grey arcs. At that point in time, the arcs do not intersect at the location of a reflecting object.

Instead they only intersect when scheme 2 has progressed a small additional amount of time Δt.

In scheme 1, the main lobe reflects off an object at T=0, and repeatedly thereafter. In scheme 2, the main lobe reflects off an object at T=Δt, and repeatedly thereafter. The reflections are detected by a receiver (not shown) and their timing is compared. This indicates that the target is at a particular unambiguous angle, but there are multiple possible locations in range, along that angle where the target might be located (black circles).

Figure 4C:
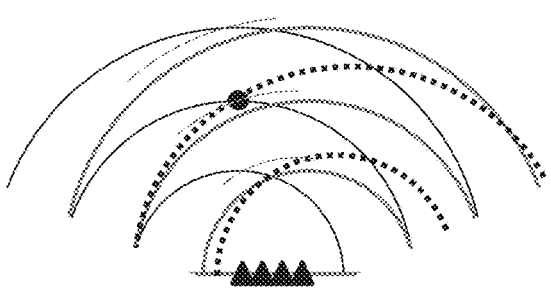

Accordingly in FIG. 4C, a third transmission scheme is used to narrow down the location of the object. The main lobe in transmission scheme has a different path than in schemes 1 and 2. Specifically this scheme has the main lobe sweeping at a slower rate (e.g. by virtue of the frequencies along the array being more similar).

During scheme 2, at T=0 the main lobe reflects off the object. The timing of this is determined by the receiver and accordingly the position of the object is determined, both in range and angle, since there is only one position where all the main lobe of the schemes occupied at those respective times.

Figure 4D:
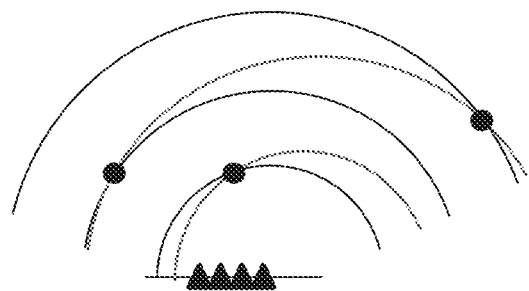
Figure 4E:
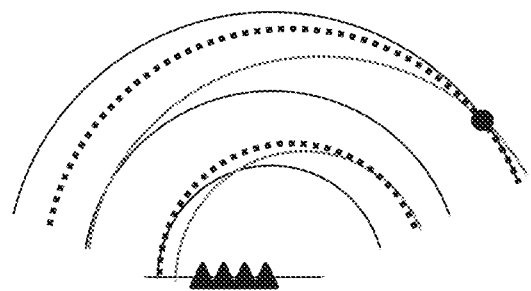

FIGS. 4D and 4E show an alternative approach. In FIG. 4D, a second scheme is introduced, this time having the same sweep direction as the first scheme, but having a different sweep frequency. This narrows down the possible positions to three positions. A third scheme is implemented, shown in FIG. 4E, which again has the same sweep direction as in schemes 1 and 2, but again has a different sweep frequency. From the timing of the reflected pulses (N.B. the transmission is continuous wave transmission, not a pulsed transmission; however, the returned reflected signal has a structure in which pulses can be identified) from the object each scheme allows the FDA detector to limit the possible positions of the object to the lines shown in the diagram. Since lines from all three schemes only intersect at one location, this can be determined to be the location of the object.

Figure 4F:
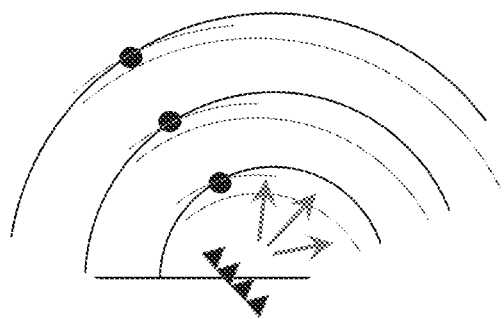
Figure 4G:
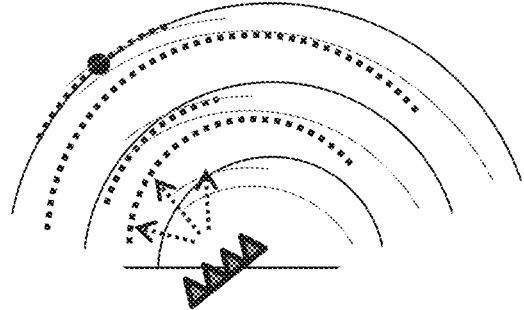

FIGS. 4F and 4G show a third alternative approach. In FIG. 4F, a second scheme is implemented. In this case it is done by changing the field of view. This changes the sweep path, but does not change the sweep frequency or sweep direction. In scheme 1 at T=0, and in scheme 2 at T=Δt the main lobes reflect off the object. From the timings of the reflections this narrows down the possible locations of the object to the three shown in FIG. 4F (black circles). In FIG. 4G, a third scheme is implemented. Again the sweep frequency and the sweep direction are the same as in scheme 1 and scheme 2, however the forward direction of the transmitter is different, and accordingly the sweep path is different. Here, the main lobe reflects off the object at T=Δt, and from the timings of the reflections resulting from the three schemes, it is possible to determine the location of the object.

Note that the arrangement of FIGS. 4F and 4G, where only the forward direction is changed, provides lower accuracy compared to using different sweep (i.e. repeat) frequencies, since there is much less difference between the main lobe sweep paths in these schemes. Accordingly if the sweep frequency and sweep direction are kept consistent, then for best results, more than 3 schemes should be used. One example is to use many schemes, each having a different forward direction and field of view, distributed for example around a 360 degree field of view.

It should also be noted that the likelihood of false negatives, and false positives is higher if the sweep frequency and direction are consistent across all the schemes. For some applications, however, a reduction in reliability is acceptable.

Note that as a practicality, the time for the reflected pulses to return to the receiver must be taken into account; however, while this requires an adjustment, it is straightforward to implement and does not change the overall method, nor greatly increase the processor calculations involved. For convenience and simplicity, the figures above only show the arcs of the main lobe at the time of the reflections, rather than showing the possible locations taking into account differing return times from differing locations. If this was shown the arcs would be slightly different, but the principle of identifying the arcs and then identifying the intersection (or other computer processing steps) achieve the same result.

Figure 5A:
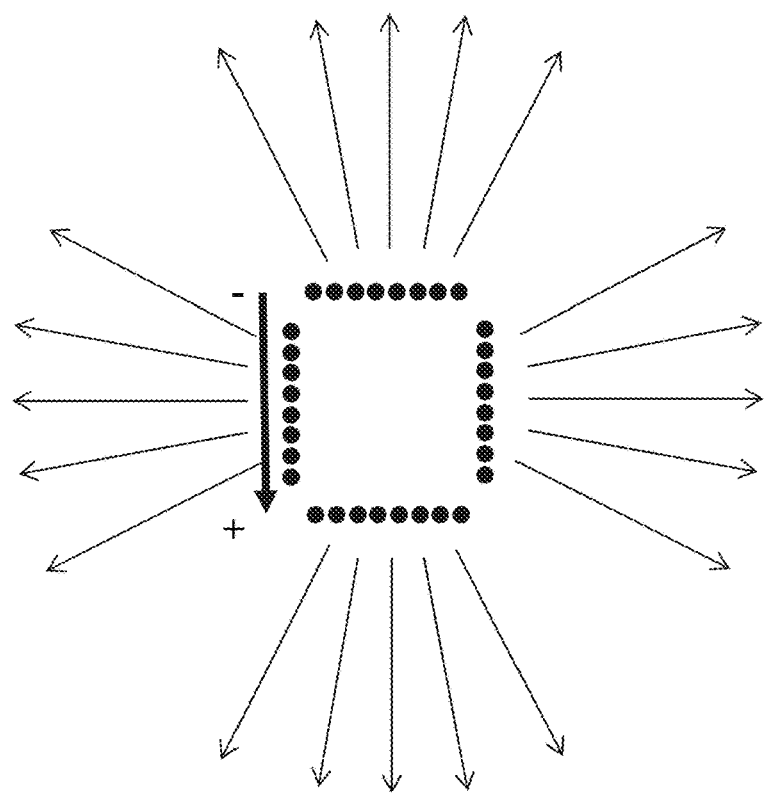
FIGS. 5A-5C are illustrations of three exemplary embodiments of the present invention.
Figure 5B:
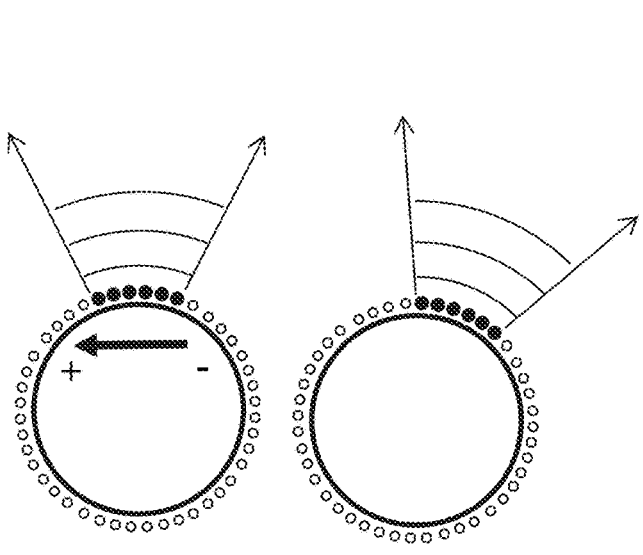
Figure 5C:
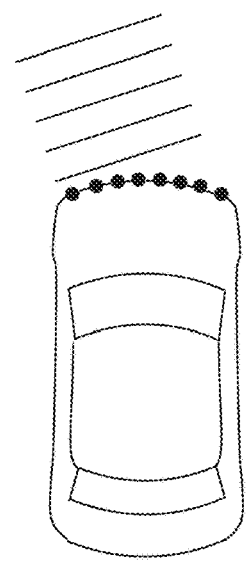

FIGS. 5A, 5B, and 5C show three arrangements of antenna elements which may be employed usefully, as illustrative examples of the many possible arrangements.

FIG. 5A shows a square arrangement of transmitter elements distributed around a blocking element (not shown) such that a group of antenna elements may be selected to perform detection over a field of view, and then (or at the same time preferably in a different frequency band) different transmitter elements may be used to view in a different direction. Preferably, the fields of view overlap. Other shapes may also be implemented, typically having rotational symmetry around a blocking element. For example, a hexagon or an oval.

FIG. 5B shows a circular array of transmitter elements. In this case, rather than clearly dividing them into sequences, one for each viewing direction, an arbitrary sequence is selected from the transmitter elements and used to transmit. The two illustrations show different time periods (or could be three simultaneous transmissions in different frequency bands), each operating according to a different scheme. Since this arrangement favors a strong overlap between each scheme, the overlap can assist in identifying the angle of the radar reflecting objects. One option is to continue stepwise around the circle to operate a total field of view of 360 degrees; however, the exact order is irrelevant and may be chosen arbitrarily.

FIG. 5C shows how an antenna array can be applied in a particular application. In this case on the front of an automobile, for example, which has a curved front surface. The antenna elements may be applied in accordance with the shape of the vehicle, and phase differences may be applied when providing the various frequencies to the antenna elements, to adjust for the antenna elements not being on a straight line. A simple way to implement a phase difference is to connect a particular antenna element via a longer piece of wire or coaxial cable, than would otherwise be used. Other methods involve using controllable phase delay devices, or minute variations in frequencies applied.

As an example of applying phase differences, a signal generator supplies coherently controlled frequencies, via three mixers, to each of a sequence of antenna elements. Note that in practice it would be more suitable to generate each antenna frequency from the main frequency, rather than from each other. A frequency mixer multiplies two inputs with the result that when two sinusoids are combined they generate a third with a different frequency. Usually a mixer adds or subtracts the frequency of one signal from the other. So for example a main frequency of 1 MHz could be used, and by mixing this with 2 kHz (or for other antenna elements along a sequence, 4 kHz, 6 kHz etc), results in each antenna element in sequence receiving 1 MHz, 1.002 MHz, 1.004 Mhz etc. along the sequence.

Different cable paths may be used to account for differences in position of each antenna element. When choosing path lengths, it is necessary to account for delays in electronic devices, and for the reduced signal speed in many types of waveguide compared to in free space.

Figure 6:
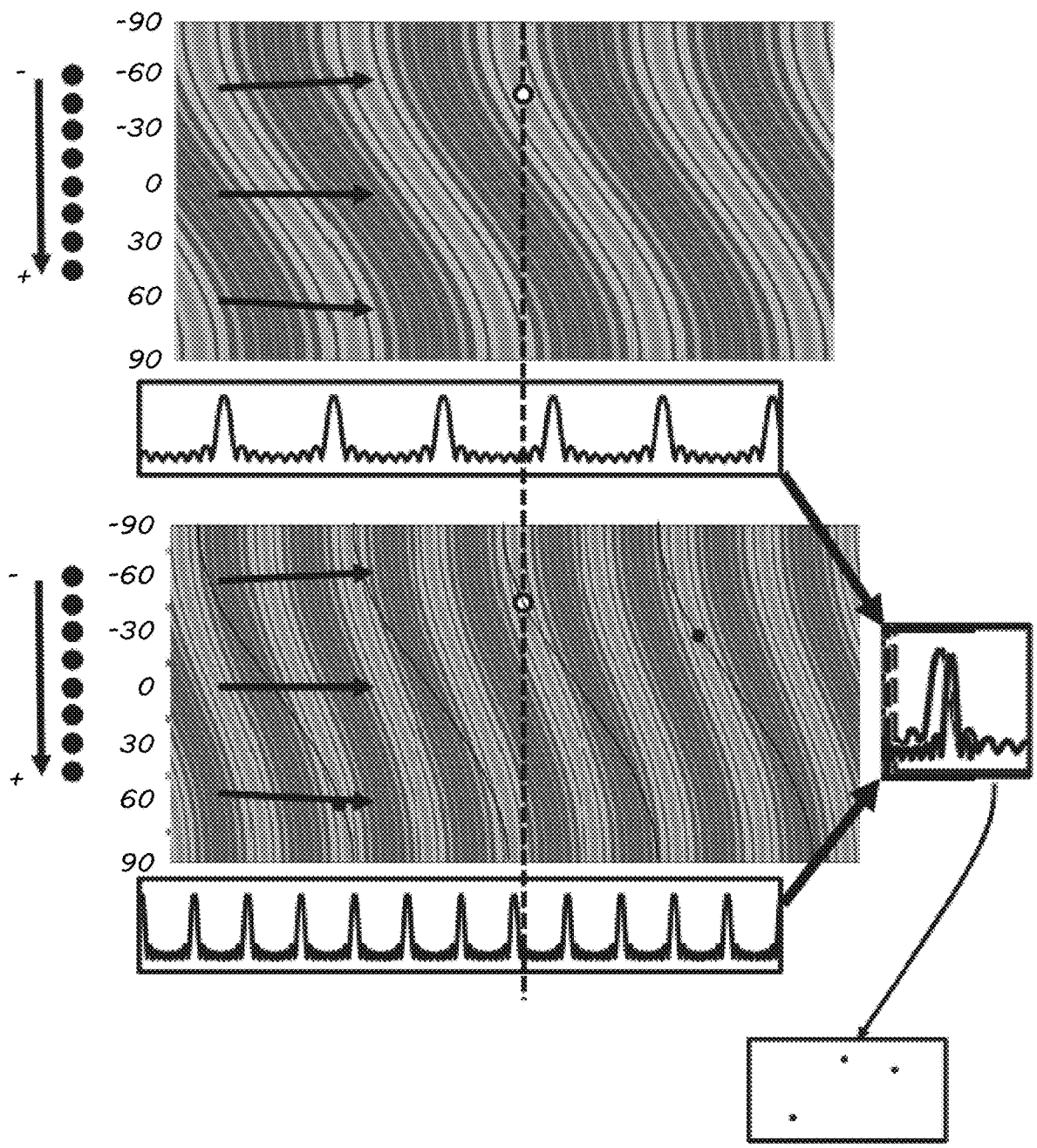
FIG. 6 shows an illustration of an FDA detector according to an exemplary embodiment of the invention, illustrating how two transmission schemes that having matching sweep direction can be used to constrain the location of an object to a sector of the field of view and range of interest, as a step within a longer process of determining range, angle or location.

Turning to FIG. 6, two transmission schemes are again shown where the frequencies applied to the sequences of antenna elements are different and in the bottom example (scheme 3) the sweep rate is much higher than in the top example (scheme 1). Using only two transmission patterns it is not possible to identify both the range and distance.

Typically more than two or three different schemes are used to distinguish the distance of objects, since typically there will be more than one object in view, and these need to be distinguished. Use of many schemes is generally more desirable in order to readily differentiate numerous objects, or to distinguish an object from clutter.

Figure 7:
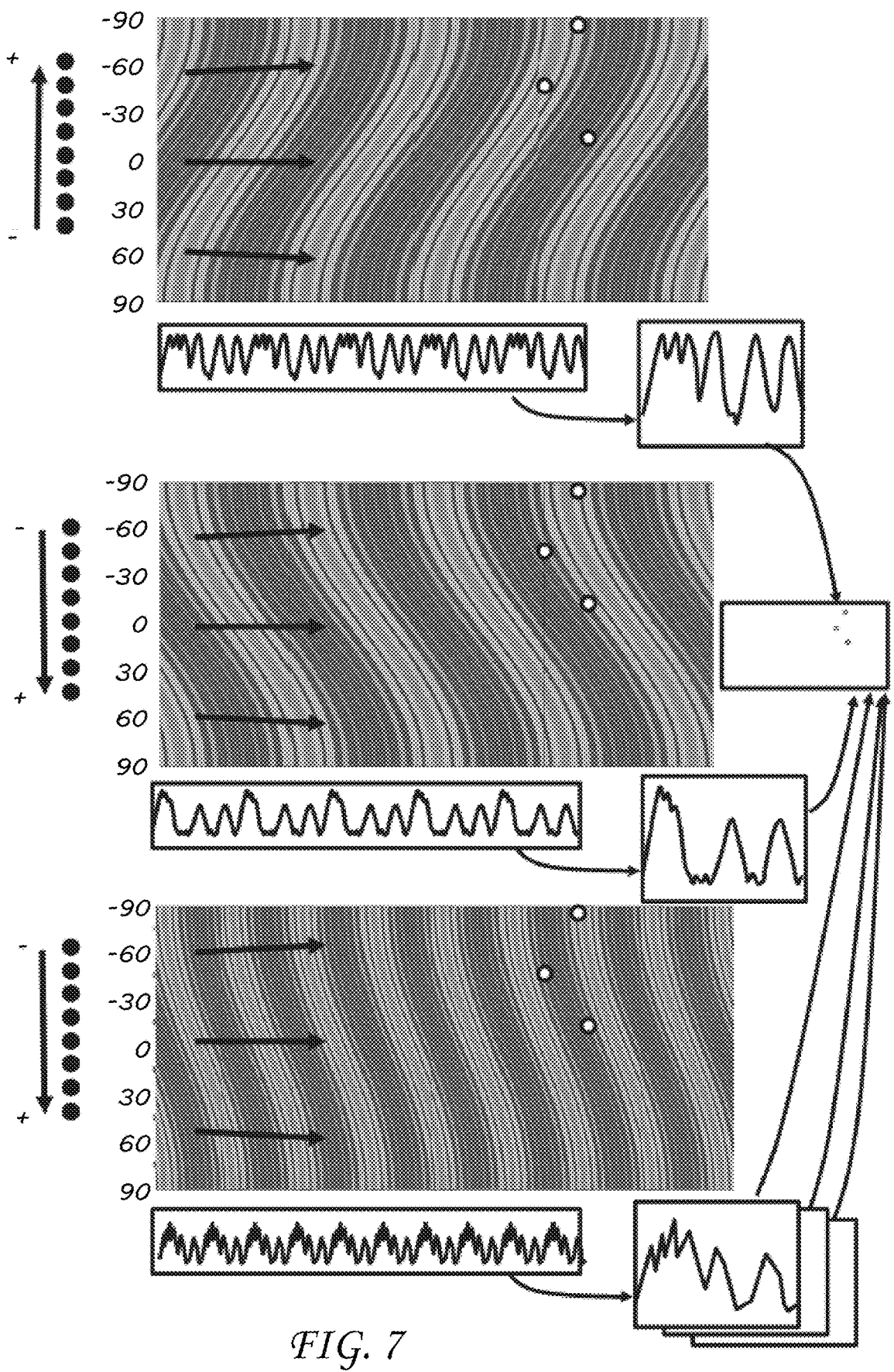
FIG. 7 shows an illustration of a CW-FDA detector according to an exemplary embodiment of the invention, showing the use of many transmission schemes with different sweep paths (additional ones indicated bottom right), including at least two of them having opposite sweep direction, to determine the locations (in both range and angle) of multiple, distinguished, objects.

Turning to FIG. 7, this figure illustrates two techniques (firstly different sweep direction with the same repeat frequency, and secondly different repeat frequency) being used together. In this example many schemes can be used, the top and middle configurations (schemes 1 and 2) have opposite sweep directions (due to, for example, opposite variation in frequency variation across the antenna elements) whereas the middle and bottom configurations (schemes 2 and 3) have different sweep rates. By combining information on the timing of returned signals, based on all three schemes it is possible to ascertain the angle and distance of the object. Additional (preferably many) schemes may be used to ensure that many objects can be distinguished (see additional output boxes bottom right, with data from additional schemes—not shown).

Turning to FIG. 8, the main lobe of a transmission pattern is shown emanating from a 2D X-Y array of antenna elements (not shown), where the frequency applied to each antenna element is varied both in the X direction and in the Y direction. Frequencies can be readily chosen using techniques known in the art, that will cause the main lobe to scan across in the X direction, and also in the Y direction. A typical approach is to arrange the elements in a grid with a spacing of half a wavelength (i.e., half the center band wavelength), and to provide a linear increase in frequency in one direction, and also apply a different (e.g. greater, preferably by a multiple thereof) linear increase in the orthogonal direction.

Figure 10:
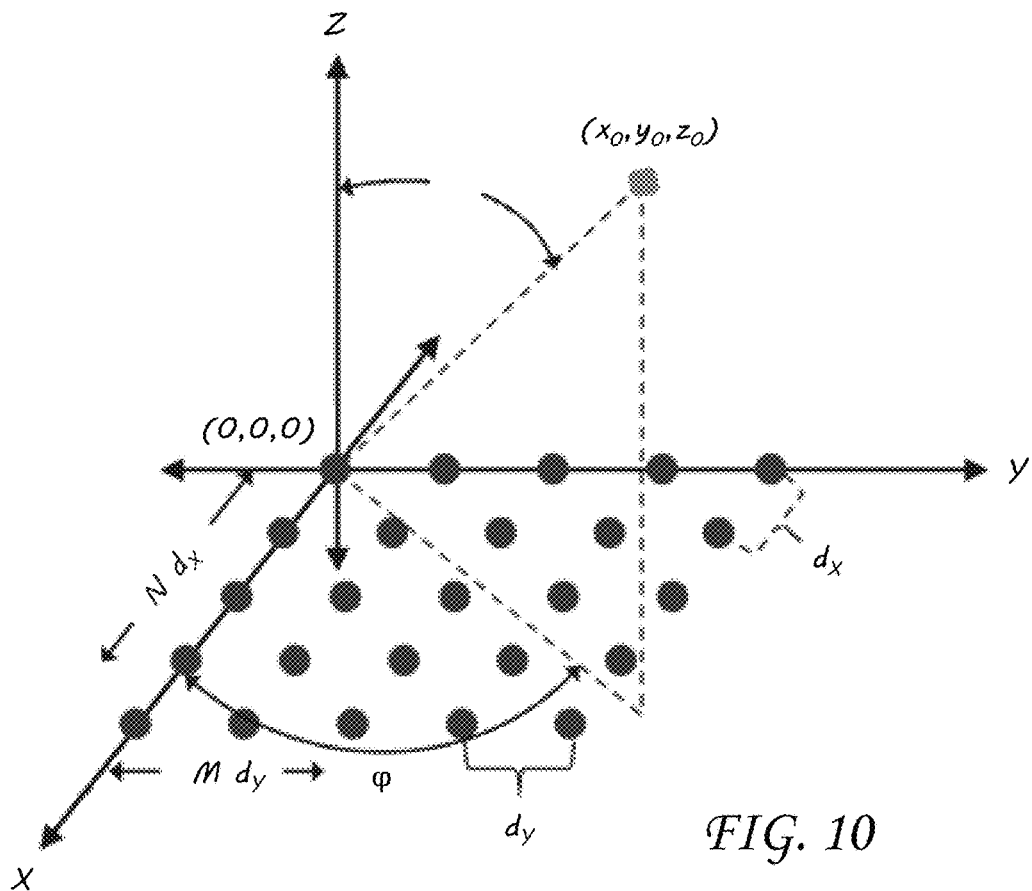
FIG. 10 shows a diagram of a CW-FDA transmitter array according to an exemplary embodiment of the invention, and various angles and distances measured thereon.
Figure 11:
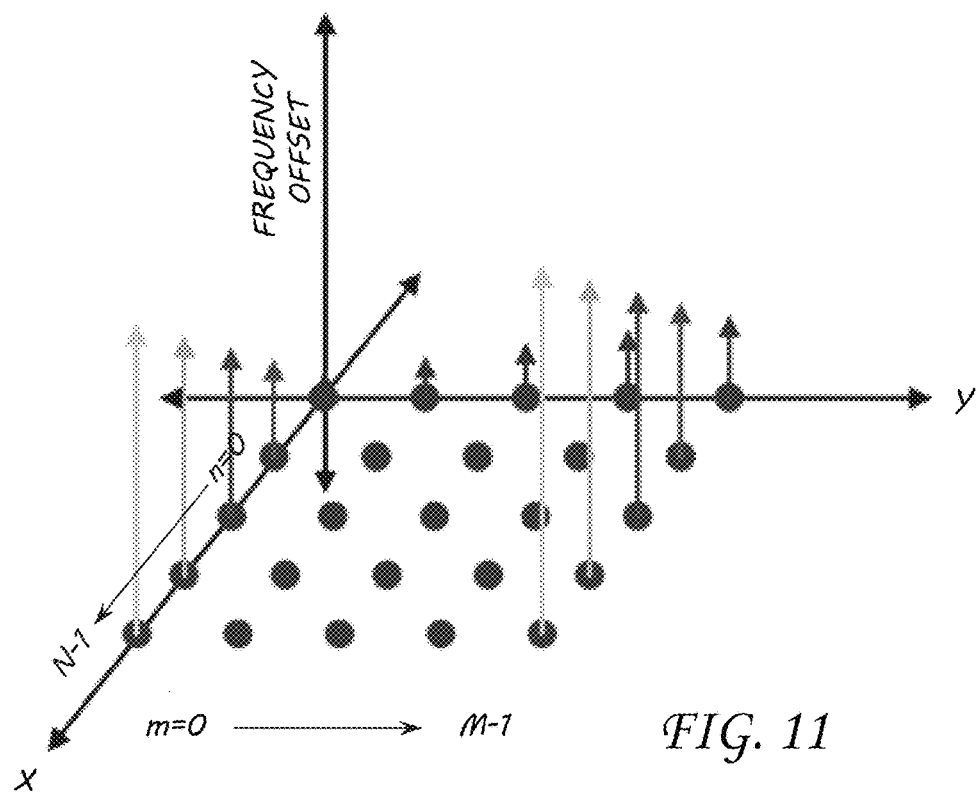
FIG. 11 shows a diagram of a CW-FDA detector according to an exemplary embodiment of the invention illustrating the different frequency offsets of each transmitter element of the array.

FIGS. 9A-9D show different arrangements of 2D spiral transmission patterns that arise from setting different linear offsets to the frequencies of the elements in a grid as shown in FIG. 10. The transmission patterns of FIGS. 9A-9D are generated by a CW-FDA transmitter with a 10 dB beamwidth and various configurations of $\Delta f_x$, $\Delta f_y$. The illustrated configurations for FIGS. 9A-9D are: $\Delta f_x$=1 KHz, $\Delta f_y$=10 KHz; $\Delta f_x$=−1 KHz, $\Delta f_y$=−10 KHz; $\Delta f_x$=10 KHz, $\Delta f_y$=1 KHz; and $\Delta f_x$=−10 KHz, $\Delta f_y$=−1 KHz respectively. The FIG. 11 shows one of these examples in more detail, with the length of each arrow representing how much the frequency of that element is different compared to the top left element.

Figure 12:
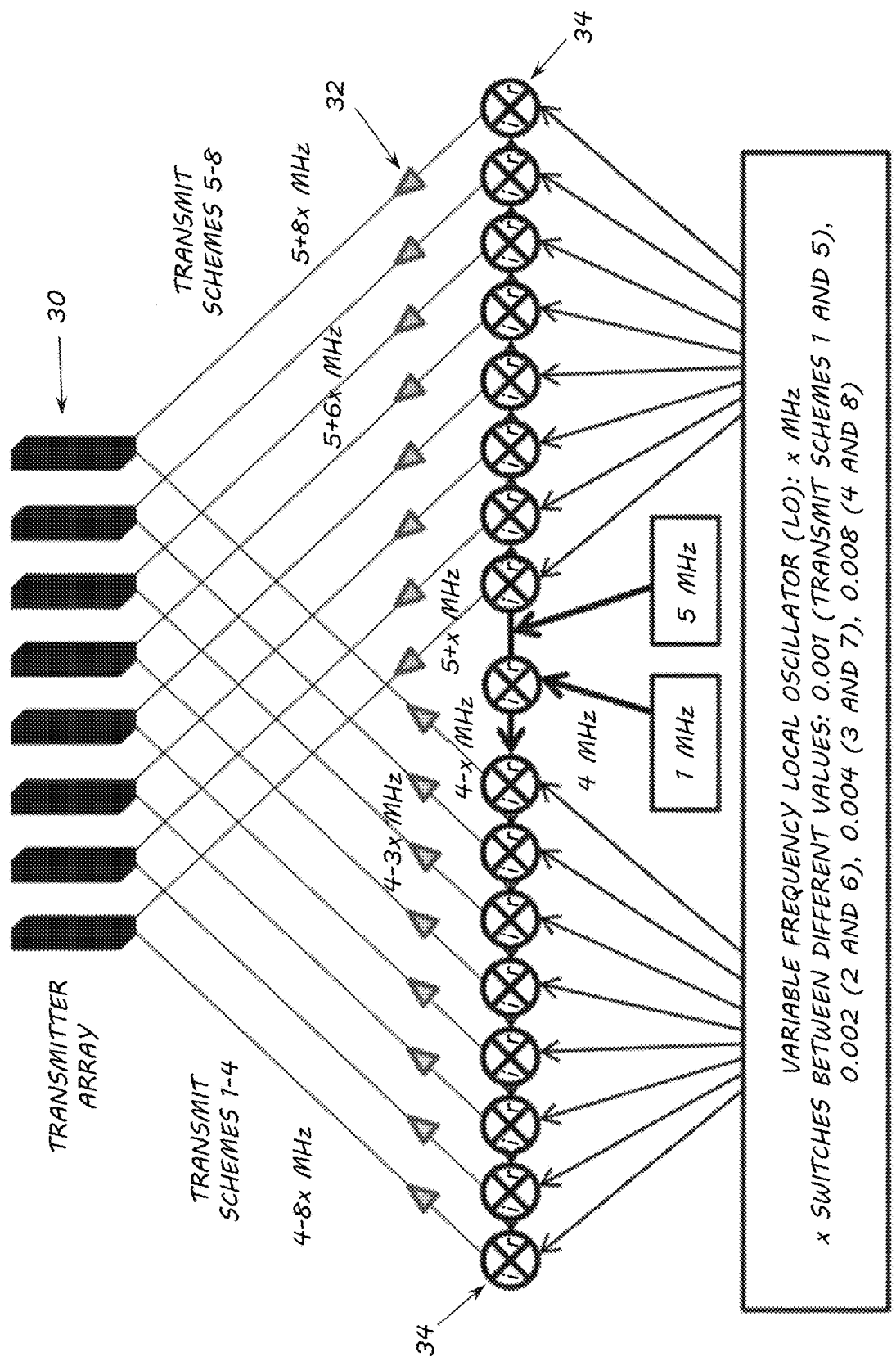
FIG. 12 shows a diagram of a CW-FDA transmitter according to an exemplary embodiment of the invention, in which 17 frequency multipliers are used with a 5 MHz carrier frequency, a 1 MHz frequency, and a low but variable frequency, to generate a first simultaneous matched pair of transmission schemes in different frequency bands, and then a second, third and fourth simultaneous matched pair also, each matched pair having greater frequency diversity than the previous one.
Figures 13, 14A:
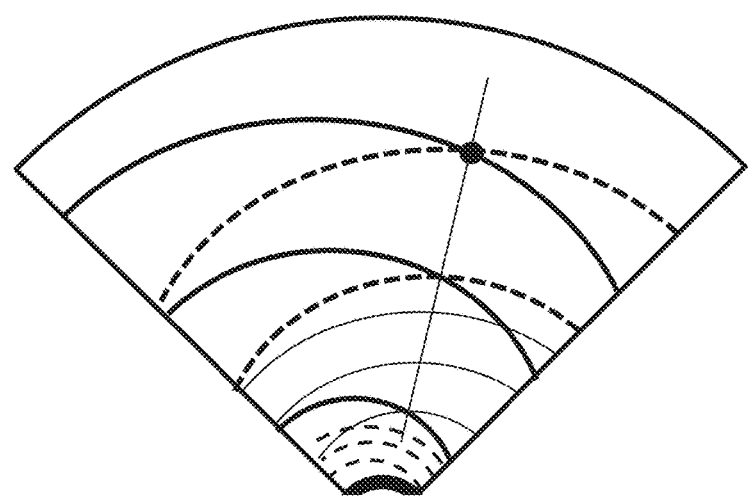
FIG. 13 shows a chart of possible frequencies to be applied to transmitter elements 1 to 8 to give rise to three matched pairs (beam paths with opposite sweep direction and equal sweep frequency) of transmission schemes.
FIG. 14A shows a simplified schematic illustration of a field of view of an exemplary CW-FDA transmitter of the present invention, showing the locations of a main lobe of each of four transmission patterns, each one at a particular point in time corresponding to when each of the main lobes impinged on one or more objects (for simplicity the objects are shown at locations where they are impinged on by main lobes at the same time)

Turning to FIGS. 12 and 13, a set of six example transmission schemes are shown in the table in FIG. 13, for a transmitter array with 8 transmitter elements (FIG. 12). All of the frequencies required for the six schemes can be generated from a carrier frequency (1 MHz), when combined with some additional low frequency signals (0.008 MHz, 0.032 MHz, 0.004 MHz and 0.002 MHz) via frequency multipliers. In FIG. 12, each of the frequency multipliers (circles with crosses in them) adds the low frequency to the high frequency to generate an output frequency. Appropriate selections of these frequencies may then be passed via switches (not shown) to an array of transmitter elements (not shown) in various orders, as set out in the table in FIG. 13.

FIG. 12 shows how a 5 MHz carrier signal may be combined sequentially through 8 frequency multipliers to generate 8 signals to pass to the transmitter elements 30 (black shapes at top) via amplifiers 32 (grey triangles). The 5 MHz signal is also passed through a frequency multiplier 34, which divides it with a 1 MHz signal to generate a 4 MHz carrier signal. The 4 MHz carrier signal then passes through 8 frequency multipliers 34, which are arranged to sequentially combine it with a low frequency signal to generate 8 successively lower frequencies. The orientation of the frequency multipliers is what governs whether it will add the low frequency to the high frequency input, or whether it will subtract it instead. The amount that gets added or subtracted from the two carrier frequencies, via each of the 16 frequency multipliers 34 depends on the low frequency signal that is fed into them. This is a variable frequency 'x', and may be chosen from a set of predetermined frequencies.

All of the frequencies are fed to the array of transmitter elements 30 (top) with the result that the 8 frequencies from 5 MHz to 5+8×MHz are fed to the transmitter array, and the 8 frequencies from 4 MHz to 4-8×MHz are also fed to the transmitter array. Thus the transmitter array simultaneously transmits two transmission schemes at a time-more specifically in this illustrated example, the two simultaneous transmission schemes are a matched pair (equal and opposite sweep frequencies). However since they are transmitted in different transmission frequency bands the receiver is able to distinguish them. After a period of time the variable frequency is changed, so that the transmitter array will be transmitting a different two transmission schemes.

The receiver (not shown) collects a signal and passes it to two bandpass filters. One of the bandpass filters allows through only those frequencies that correspond to the transmission from the frequency multipliers at the right hand side of FIG. 12. The other bandpass filter allows through only those frequencies that correspond to the transmission from the frequency multipliers at the left hand side of FIG. 12. Accordingly the returned signals from each of the transmission schemes can be collected and digitized independently, and the signals can then be compared to detect the objects. Note that if the signals were first digitized, then the band pass filters could be implemented by a digital frequency filter. This is simpler approach, but may potentially add cost.

Figure 14B:
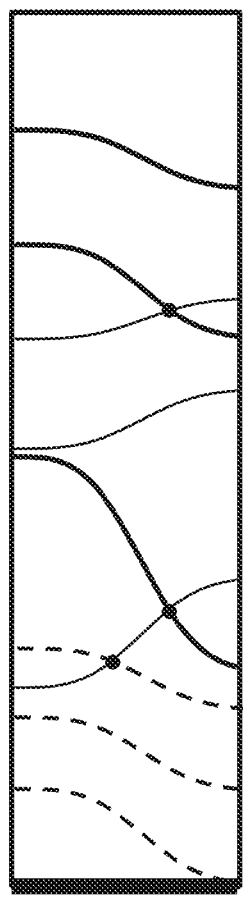
FIG. 14B shows how the arrangement shown in FIG. 14A can be remapped into a Cartesian representation of angle vs range, with angle being mapped onto one Cartesian coordinate, with three of the transmission patterns shown.
Figure 14C:
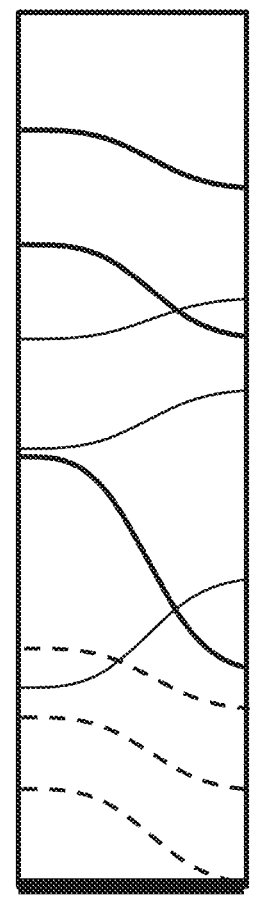
FIG. 14C shows how the arrangement shown in FIG. 14B can be remapped so that range is shown on a logarithmic axis.

FIGS. 14A to 14C show in illustrative form, the main lobes of three transmission schemes, at a particular point in time (during each of those transmission schemes). For simplicity each main lobe (shown as an arc) is swept three times, however in practice it would typically be at least ten times, preferably tens of times, preferably thousands of times, possibly millions of times. In FIGS. 14A-14C, the first transmission scheme is shown in thick black line, the second in thin black line, and the third in dashed line. Transmission scheme 2 has opposite sweep direction compared to transmission schemes 1 and 3. Transmission schemes 1, 2 and 3 all have different sweep frequency. Note that the propagation velocity (in the radially outward direction) is the same for all transmission schemes.

FIG. 14A shows the main lobes in the process of propagating outwardly within a field of view. In reality they may propagate out spanning a wider angle, but for simplicity only the field of view is shown. The field of view can be the angular range across which returned signals usefully produce detections of objects, the angular range across which the computer processor is arranged to detect objects and/or the angular range that the receiver is sensitive to. Unlike FIGS. 14B and 14C, FIG. 14A also shows an additional transmission scheme with a fourth pattern that—like the others—exhibits a repeating spiral. The two transmission schemes in bold line (one complete, one dotted) are equal and opposite spiral patterns, however are shown at different timings—specifically the time when they impact on the object (black dot). This shows that using two transmission schemes with equal repeat frequency the angle (azimuth) of the object can be more readily determined.

Each of the arcs shown within the field of view can be understood to be the range of possible locations of an object, based on the timing that a pulse of energy was received back at the receiver. The exact shape of the arc of possible locations will depend on the location of the receiver, which does not need to be at the same location as the transmitter array.

FIG. 14B shows this arrangement remapped so that range is mapped vertically, and angle is remapped so as to be represented as a horizontal Cartesian axis. Nearby locations now take up proportionately more space than before the remapping, and distant locations now take up proportionately less space than before the remapping. The paths on which it has been determined that an object must lie are no longer simple arcs, but are instead serpentine curves. The maps (with the arcs/curves) are compared according to a selected map resolution. It is evident that by remapping into a rectangle, there is not only less wasted space, but also the resolution favors more accurate detection of nearby object, at the expense of accuracy for the distant objects.

Turning to FIG. 14C, the maps are remapped a second time. This time the distance axis is remapped so it is no longer linear but instead is logarithmic. This favors accurate mapping of nearby objects at the expense of distant objects. FIG. 14C shows the results of comparing the three results from the three transmission schemes. This identifies the position in range and angle of three objects.

It can now be seen that it is potentially not useful to map the results of transmission scheme 1 except in the nearby region of the map. This is because towards the far end of the map, the distance between adjacent main lobe detection lines may become smaller than the resolution that the results will be mapped at.

With the exception perhaps of a radar on a spacecraft where only one or two objects are in range of detection, FIGS. 14A-14C are typically far simpler than the real situation. In a real situation there are typically not only a large number of objects, but the objects may have shape. As an example, an urban environment provides a very complicated return. To deal with the complexity, a large number of transmission schemes must be transmitted. Each transmission scheme results in a map consisting of a typically huge number of sets of arcs/curves, the strength of each set of arcs/curves being an indication that one or more objects is probably located somewhere on at least one of those arcs/curves. However by comparing and combining many such maps that have different sweep paths, it is possible to build up a map of where reflecting material/objects are located.

The tables in FIGS. 15A-C and 16A-C list a range of example embodiments and also possible applications for those embodiments of the invention. The numbers given are examples, which may be used as a starting point for designing other suitable embodiments.

Figure 17:
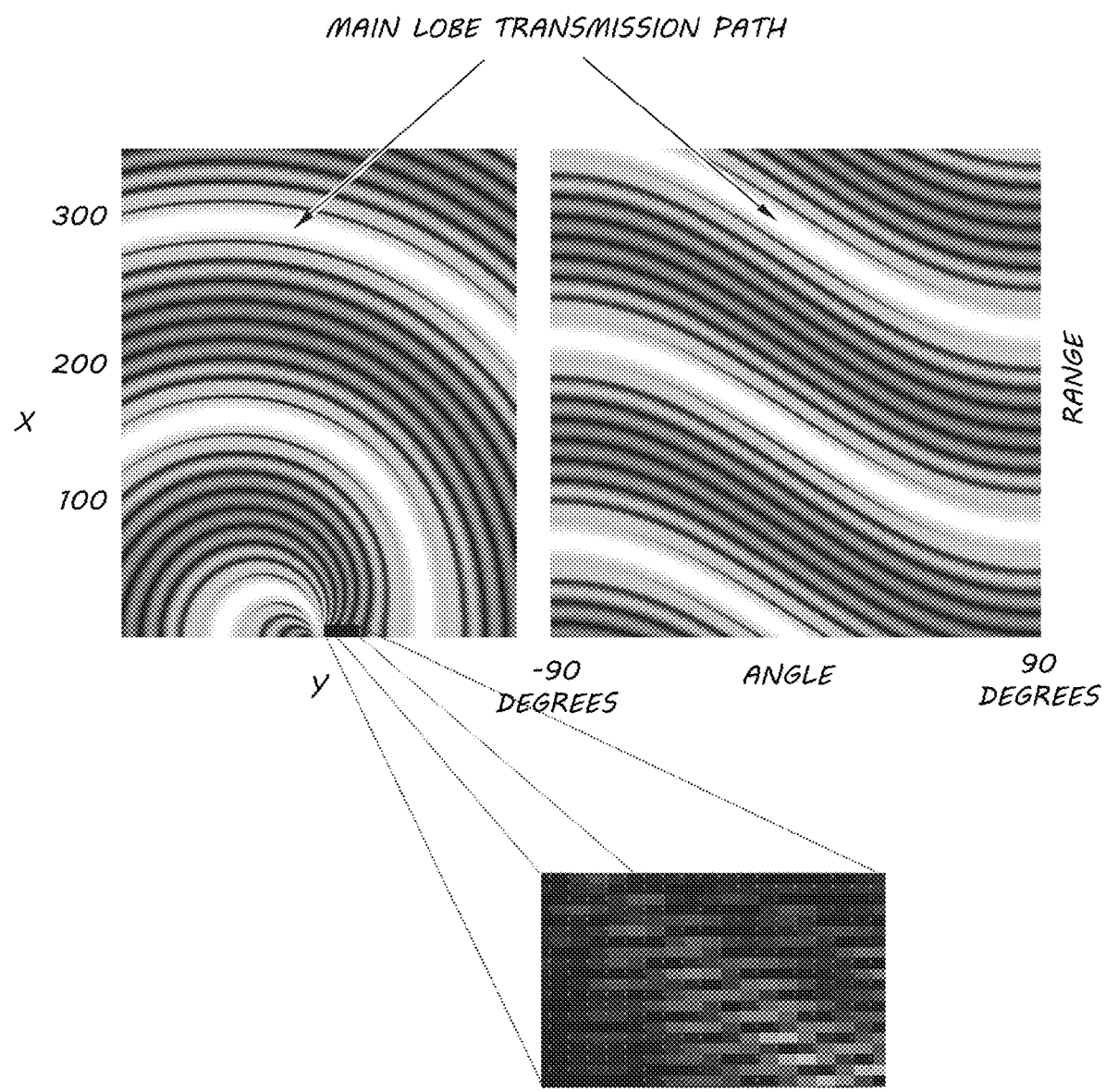
FIG. 17 shows plots based on 10 equally spaced transmitter elements with a linear increase from 1 to 0.91 in the continuous wave frequencies applied to them with spacing 0.5 and sampling rate 1.5, and showing the scale of the path of the main lobe (thick white curve) compared to the wavelength of the transmitter (visible in bottom right illustration)

FIG. 17 shows a spiral main lobe pattern from a transmitter with 10 elements with frequencies from 1 to 0.91. The units given are arbitrary units of frequency (as is the case in FIGS. 18 to 24), which could for example be GHz, in which case the frequencies are 1 GHz to 0.91 GHz. And, in this exemplary case, the grid spacing for the simulation (which is 0.5 wavelength distance) is then 15 cm, so a small region is shown being a range of about 240 cm×15 cm or about 0.36 m$^2$. The frequency units could alternatively be tens of GHz or any other value. Bottom right, the wavelength can be seen up close up. As with FIGS. 18-24, faint equal range lines are shown (curved in x-y coordinates, straight in range-azimuth coordinates).

Figure 18:
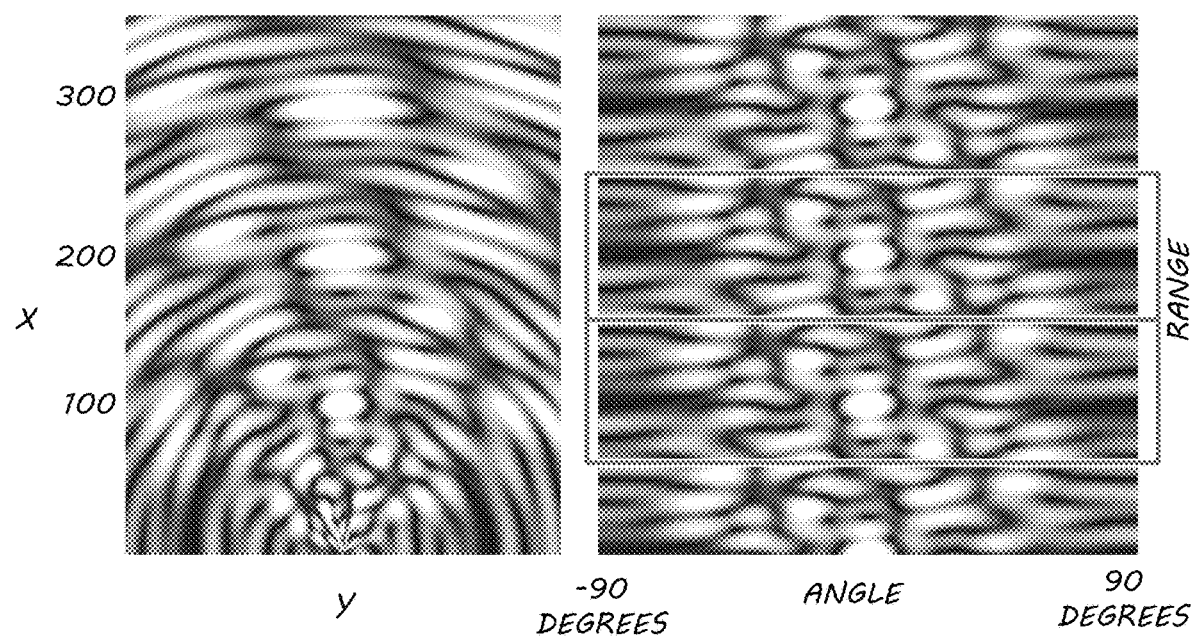
FIG. 18 illustrates a pseudo chaotic transmission pattern exhibiting a regularly repeated arrangement of constructive interference regions for a 10 element transmitter with sampling rate of 1 and spacing of 0.5, and frequencies from left to right of: 1.01, 1.04, 1.02, 1.03, 1.08, 1.01, 1.01, 1.07, 1.03, and 1.02.

FIG. 18 shows a pseudorandom transmission pattern. The frequencies (1.01, 1.04, 1.02, 1.03, 1.08, 1.01, 1.01, 1.07, 1.03, and 1.02) which are in arbitrary units (E.g. GHz) are chosen so that after a period of time they repeat together, leading to a repeat of the pseudorandom transmission pattern. Since the pseudorandom pattern has various regions of constructive interference at each point in azimuth (in a field of view of interest) the timing of signals coming back reflected from an object provides the detector with some information about the possible locations of that object. If this was repeated many times with different pseudorandom transmissions patterns in respective transmission schemes that all have the same repeat frequency, then, with enough transmissions, it would at some point become possible to infer the azimuth of the object. If it was then repeated with enough transmission schemes with different repeat frequencies then it would at some point become possible to infer the range of the object. That said, use of a transmission pattern that has a one-to-one relationship between azimuth and range within each repeat, such as a spiral, requires fewer different transmission patterns.

Figure 19:
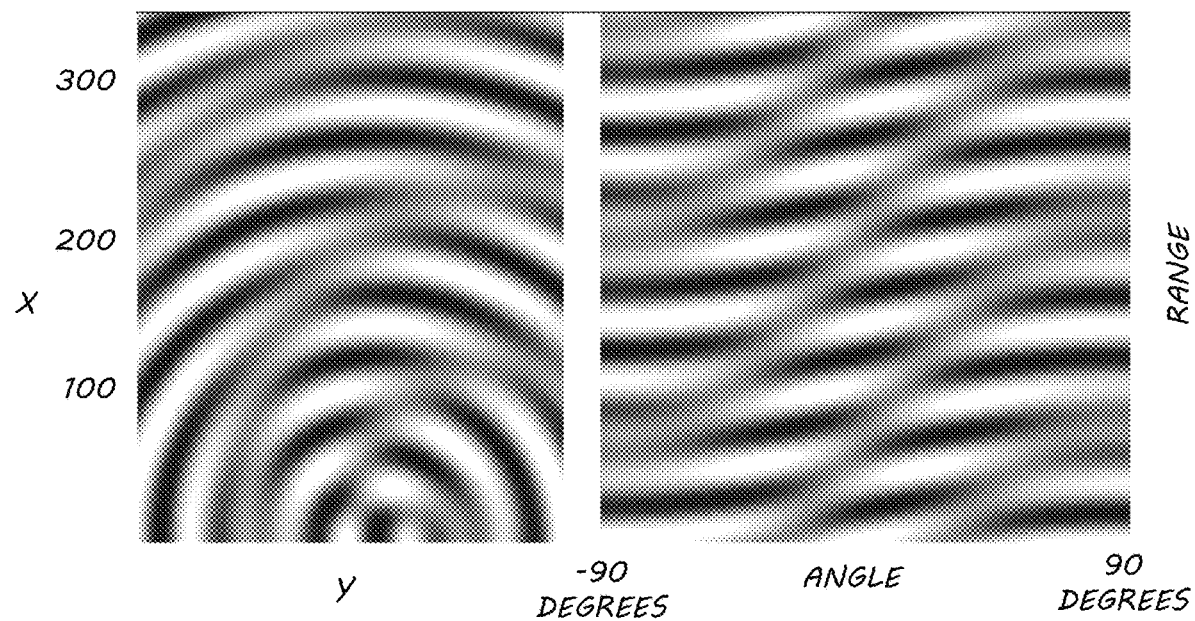
FIG. 19 illustrates a possible transmission pattern from a sequence of two transmitter elements with frequencies of 0.2 and 0.27, spacing of 4, and a sampling rate of 10.
Figure 20:
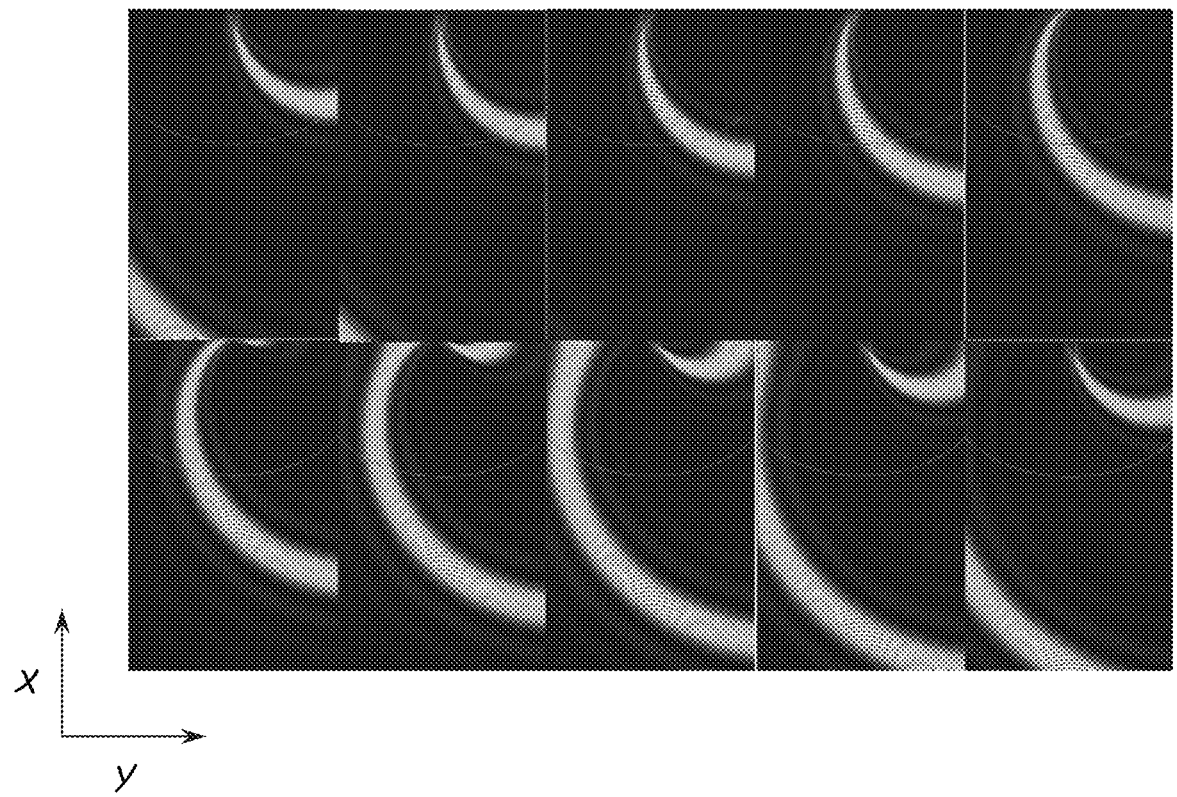
FIG. 20 illustrates a spiral pattern at 10 points in time, illustrating how the radial propagation of a spiral transmission pattern over time has the (false) appearance of a rotation of the pattern, and shows how a main lobe of constructive interference has the effect of sweeping azimuthally across the field of view as time progresses for a transmitter with 10 elements with linear increase in frequencies from 1 to 1.09 and sampling rate of 5.
Figure 21A:
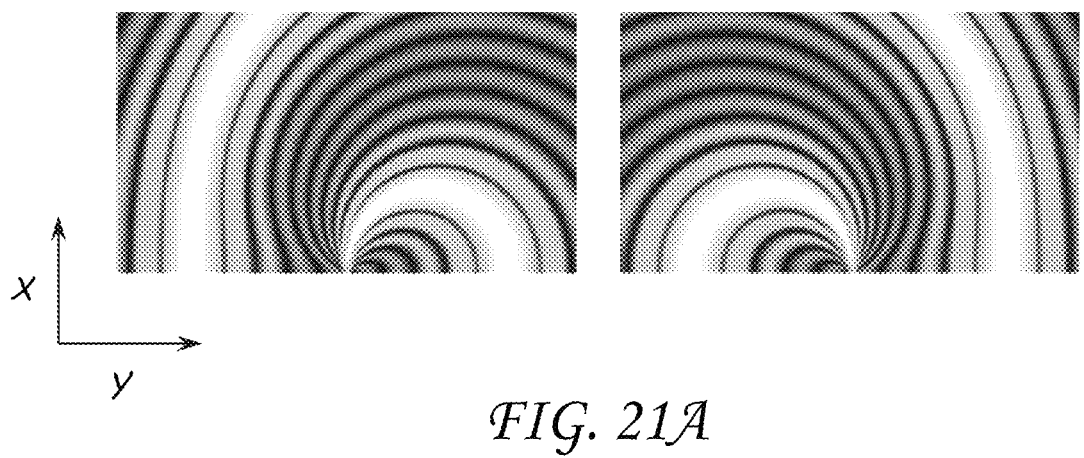
FIGS. 21A-21C illustrates six spiral transmission schemes from a transmitter with 10 elements with a linear increase in frequencies and a sampling rate of 1, each with a single transmission pattern, organised as three matched pairs to help determine both azimuth and range, FIG. 21A has frequencies from 1 to 1.045, FIG. 21B has frequencies from 1 to 1.09, and FIG. 21C has frequencies from 1 to 1.18.
Figure 21B:
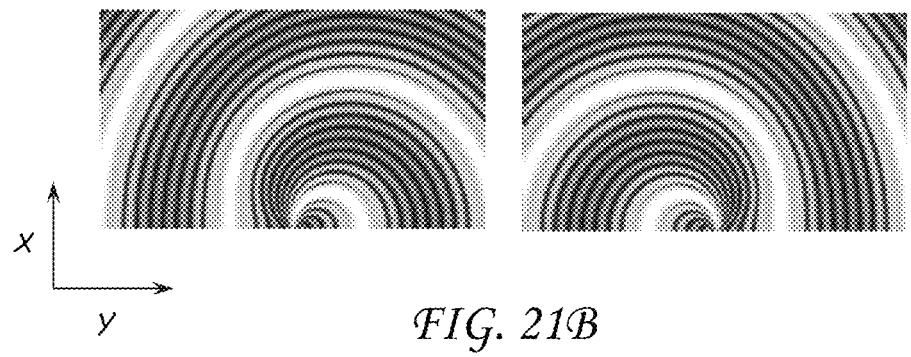
Figure 21C:
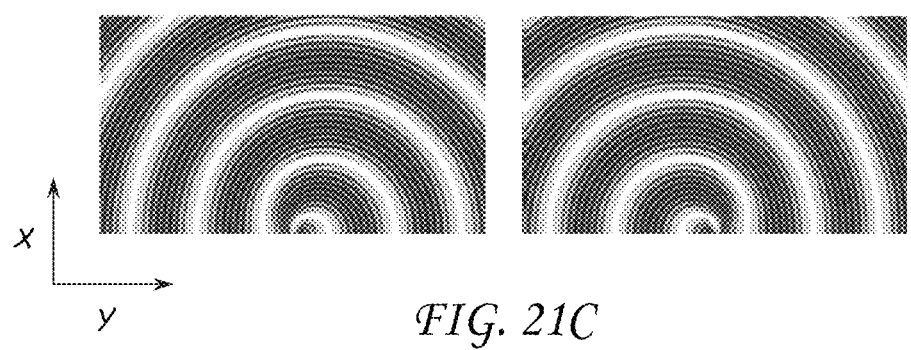
Figure 22:
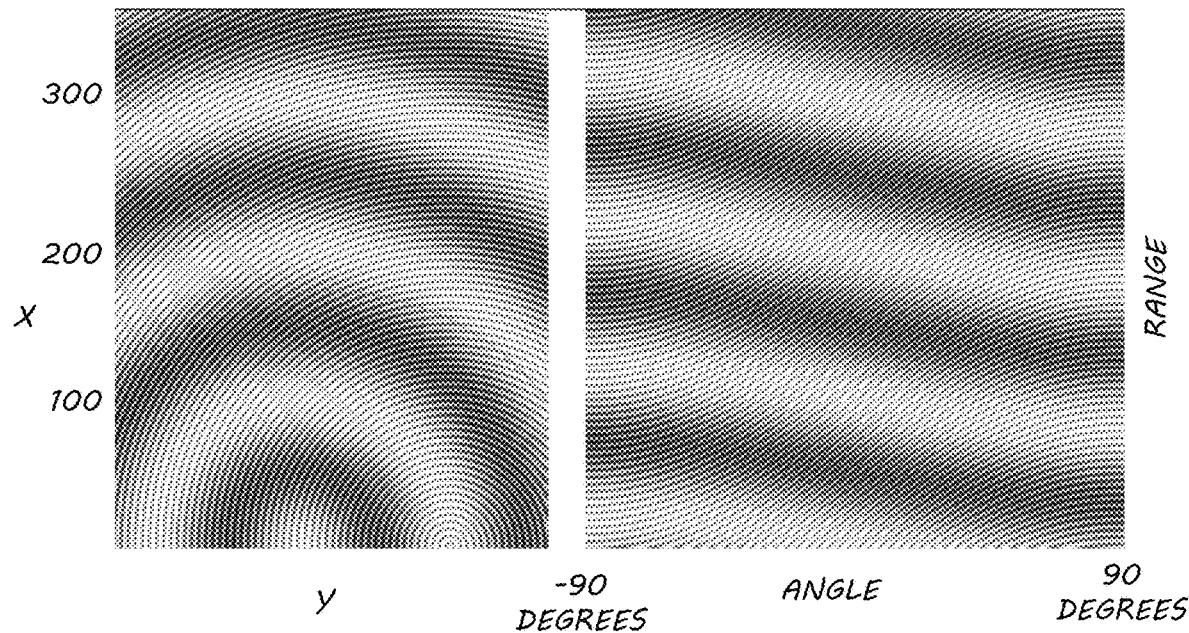
FIG. 22 illustrates how two distinguishable transmission patterns can be exhibited in a single transmission scheme for a transmitter with 2 elements with frequencies of 0.2 and 4.2, a sampling rate of 80, and spacing of 5—the leftward sweeping spiral has a much faster repetition rate than the rightward sweeping slow spiral, enabling the receiver or computing device to distinguish them.
Figure 23:
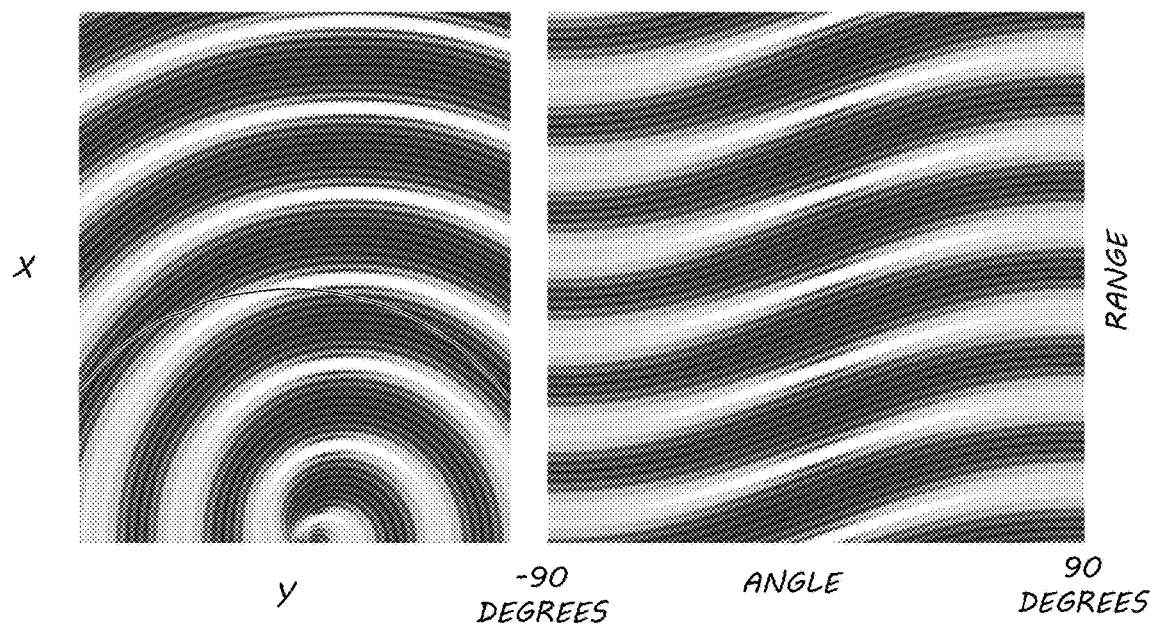
FIG. 23 illustrates how non-linearity in the variation of frequencies across the transmitter elements can be implemented (10 elements with a nonlinear arrangement of frequencies: 1.0000, 1.0510, 1.1021, 1.1532, 1.2043, 1.2555, 1.3068, 1.3581, 1.4094, and 1.4608 for this example), which could be used, for example for reducing a clear pattern at high angles either side of a forward direction in the case that the transmission is short (only a moderate number of sweeps is performed so the pattern remains substantially the same from sweep to sweep)
Figure 24:
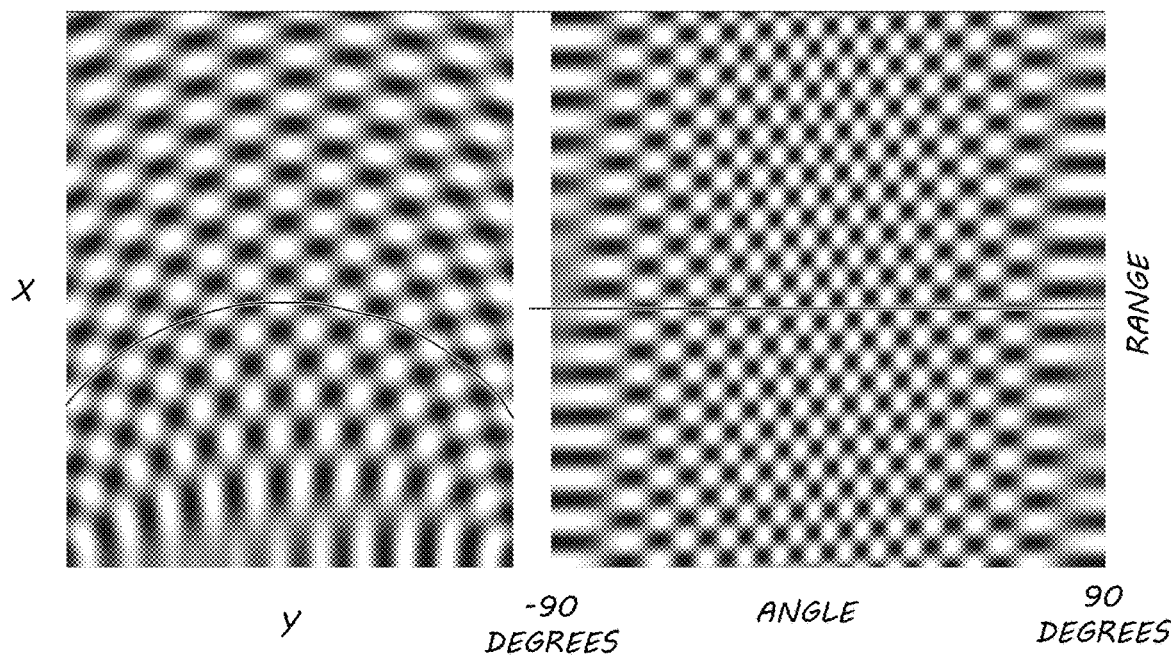
FIG. 24 shows an example of an alternative pattern, where regions of constructive interference are arranged in a rhombic grid (when plotted in range and azimuth) for a 2 element transmitter with frequencies at 5.2 and 5.7, and element spacing 2 (about 11 wavelengths) and sampling rate 150.

FIG. 19 illustrates another approach using two transmitter elements, showing how readily very different transmission patterns can easily be generated. FIG. 20 shows a spiral transmission pattern evolving over a sequence of ten points in time. As can be seen it looks like the spiral is rotating, whereas in reality it is propagating radially. However, the effect is that an object impacted by the spiral form is a function of the azimuth of the object. Thus timing of returned signals contains information that helps to constrain possible locations of the object, to a path that is spiral. FIGS. 21A-C show six spiral transmission patterns, repeating at different frequencies, arranged in matched pairs. FIGS. 22 and 24 show transmissions from widely separated antenna elements with differing frequencies. FIG. 23 shows the effect of a transmitter with a non-linear arrangement of frequencies on a linear array of transmitter elements, at a particular point in time, which can be used for a brief period of time before the non-linearity causes the pattern to change.

Throughout the above disclosure, a simplification was made purely for purposes of brevity. Technically, the timing of the returned signal does not constrain the position of the object to the exact location of a spiral at a particular point in time. This is due to the time taken for the reflected signal to return to the receiver (which is usually, but not necessarily at essentially the location of the transmitter). This effect means that detection of a returned signal at a particular point in time constrains the location of the object to a set of possible locations, but that set of possible locations may be a slightly different shape compared to the shape of the constructive interference pattern (in the case of a spiral transmission pattern, the constrained locations would be a slightly different spiral). Simple arithmetic allows identification of the possible locations as a result of a signal being received at a particular time, based on data on the transmission pattern.

Also note that where the word 'timing' is used, generally the received signal will be a repeated signal (many repeats), so the timing of interest is in a time scale equal to the repeat frequency of the repeating pattern (which requires precise measurement). While FIGS. 1A, 2, 3, 6 and 7 show propagation direction across the page, the other figures show propagation direction up the page. Also aside from the bottom right part of FIG. 17 and the ten illustrations in FIG. 20 (which shows a sum of real components of the contributions from each antenna element), the other simulations show an absolute value of the sum of the complex values of the contributions from each antenna element.

Generally speaking, a continuous wave, frequency diverse array (FDA) Detector, Transmitter, Receiver and/or Method are provided. The frequencies may be either radio waves or sonic waves. Different frequencies may be applied to each transmitter element, to generate transmissions schemes with repeating patterns of constructive interference (e.g. each pattern may be a spiral). The patterns differ (e.g. opposite spiral directions to help determine azimuth, or different spiral rotation speeds to help determine range), to a sufficient extent that from the timing of signal reflected back as a result of each one, the azimuth and/or range of an object can be determined irrespective of where the object/target is in the field of view. Use of continuous wave transmissions enables lower transmission powers and/or avoids requiring an expensive beam-steering transmitters or receivers.

The term azimuth is used to mean a measurement angle, which can be chosen to be any orientation, which commonly will be an angle across horizontally. The term elevation means an axis orthogonal to azimuth.

The receiver for some embodiments may be a fixed geometry receiver (e.g. a horn receiver) and may be directional or omnidirectional (omnidirectional in either 2D or 3D). This has the advantage of enabling detection across the field of view of the transmitter without requiring the expense and complexity of beamsteering. Alternatively, a beam-steering receiver may be used (e.g. rotating dish or phase array antenna type). This is useful to help distinguish objects, or to take advantage of a more complicated radar system already available at a particular installation.

The term 'substantially continuous wave' is used because the frequencies will always be left on (transmitting) continuously for a period of time that is longer than the period of time required for a typical region of constructive interference in a transmission pattern to start and finish impacting upon a target object at a point location. By comparison, pulsed transmissions use the briefness of the pulse (at a particular frequency in the case of a chirped pulsed transmission) and they cease transmission after each pulse to enable the range to be unambiguously determined.

By contrast, in some embodiments, it may be desirable to send multiple repeats, and in the case of range determination, to use the different frequency of the repeats in each transmission pattern to constrain the possible locations to the extent that range can be inferred. And, in the case of azimuth determination, to use the same frequency of repeats in each transmission pattern to constrain the possible locations to the extent that azimuth can be inferred.

The frequencies would normally be turned on and off, either in accordance of when the equipment is used, or for example they may be left on for a number of repetitions of the repeating pattern to be transmitted and then turned off (e.g. to allow a different transmission scheme to be transmitted in the same frequency band instead).

Thus, the term 'repeating' refers to the nature of the signal due to the frequencies used, which would repeat if left on, rather than a requirement to transmit consecutive repeats. Transmitting multiple repeats of each transmission pattern, is extremely desirable, however while it is preferable, they need not be consecutive repeats. In some embodiments, the frequencies may remain on for at least two, at least 10, and at least 100 repeats.

Regarding the term "arranged to provide at least two respective transmitter elements with signals of respectively different frequency" this typically but not necessarily means that the frequencies are constant.

Also note that in the case of non-linear frequency FDA arrays each repeat will typically vary slightly from one to the next, and if consecutive repeats have similar characteristics (e.g. similar areas of constructive interference) this is still considered a repeat. In addition to the advantage that substantially identical signals can be produced, the advantage of a deterministically repeating signal is that the signal to be transmitted may be accurately known, and a comparison to the returned signal is made easier, irrespective of which repeat is transmitted.

The term 'reflective' means that it is reflective to the type of wave being transmitted (radar or sonic), rather than meaning that it has a particularly high reflectivity. Determination of the azimuth and/or range of an object is only possible if an object is present and is both in the field of view of interest, the range of interest, and the field of view of the receiver. It is only necessary to be able to determine the azimuth and/or range of such an object in the case that there are no other such objects. However, the transmission patterns (particularly the diversity and number thereof), may be sufficient to distinguish and independently identify azimuth and/or range of a plurality of objects.

The term "in combination with any other information the CW-FDA Detector is arranged to obtain" refers to the possibility that the CW-FDA Detector has additional functionality. Purely as an example, suppose an additional sensor or functionality was included, adapted to detect whether the object is to the left or to the right. In this case the signals only need to be able to distinguish angle either side from the forward direction, and thus the regions of constructive interference could be symmetric about the forward direction and still be sufficient to determine azimuth. Optionally, the CW-FDA Detector may not be arranged to obtain additional information regarding azimuth and/or range. Alternatively, the CW-FDA Detector may be arranged to obtain additional information regarding azimuth and/or range.

Generally, regarding at least one of the transmission patterns, preferably all of them, within each repeat of the repeating pattern, the pattern has area(s) of constructive interference distributed in azimuth. This enables determination of azimuth. And, generally, regarding at least one of the transmission patterns, preferably all of them, within each repeat of the repeating pattern, the pattern has area(s) of constructive interference distributed in range. This enables determination of range.

Either sonic wave energy (sonar, ultrasound, etc.) may be used or radio wave energy (RADAR) may be used, although clearly all the transmissions and signals will be of the same type.

In some embodiments, the detector may be a radar detector, the transmitter being arranged to transmit radio waves, and the receiver being arranged to receive radio waves. The frequency range would generally be in the range 3 kHz to 3

THz, for over the horizon radar preferably between 3 and 30 MHz, and for ground wave systems 30-520 kHz, but for other typical applications above 300 MHz and below 300 GHz, typically in the range 1 to 100 GHz, which has the advantage of providing a compact transmitter and high resolution.

Alternatively, in some embodiments, the detector may be a sonic detector, the transmitter being arranged to transmit sonic waves, and the receiver being arranged to receive sonic waves. The frequency range would generally be in the range of 100 Hz to 20 MHz, with lower frequencies suited to active seismic detection, ultrasound frequencies suited to for medical and engineering detection or imaging, and mid-range frequencies (e.g. low ultrasonic frequency range, e.g. 40 kHz) suited to detection of objects through air.

The signals resulting from reflections of the transmission patterns are typically distinguishable as a result of being transmitted in different transmission schemes. Transmission schemes differ by being in different frequency bands, or transmitted during different periods of time (or conceivably with distinguishable polarisation etc). In general, some form of waveform orthogonality should be used. Note that it is possible to have two or more distinguishable transmission patterns in one transmission scheme, by virtue of having unique characteristics (such as one being a fast spiral shape, and the second being a slow azimuth-independent amplitude variation caused by applying two very similar frequencies to some of the antenna elements. This is illustrated in FIG. 22. However, it is challenging to use a plurality of transmission patterns from a single transmission scheme to establish either range or azimuth unambiguously and accurately so at least two transmission schemes are needed. Typically, there is only one transmission pattern per transmission scheme.

In some embodiments at least two of first, second and ideally third or all transmission schemes may be transmitted in differing frequency bands, and the receiver may be arranged to separate returned signals of the frequency bands. This enables the transmission of each transmission scheme to be performed for longer, potentially increasing the signal to noise ratio. Alternatively or additionally, at least two of first second and ideally third or all transmission schemes may be transmitted in differing and distinct time periods (e.g. in alternating order). This enables easier identification of which returned signal corresponds to which scheme. Irrespective of whether the transmission schemes are in different time periods or different frequency bands, the frequencies may be transmitted from the same sequence of transmitter elements. This enables a smaller transmitter. Alternatively they may be transmitted from a different sequence of transmitter elements (which may have some or none in common, and which may have physical overlap in a direction corresponding to a linear sequence)

Typically, in the first (or each) transmission scheme, the frequencies provided to each transmitter element of the sequence, are a varying function of the position of the transmitter element along the sequence in a first direction, such as to generate a spiral transmission pattern sweeping repeatedly at a first sweep frequency, across the field of view. The spiral transmission pattern may propagate in a forward direction across a field of view of up to 180 degrees, or alternatively may include the reverse direction as a mirror image of the half spiral shape, or indeed in all directions around an axis of a linear array of transmitter elements. Typically, the spiral transmission pattern is a path of constructive interference constituting a main lobe of the transmission pattern. Alternatively, especially if there are only two antenna elements, the transmission may lack a main lobe, or else each lobe can be treated if it were a main lobe.

Use of two antenna elements gives a wide range of possible transmission patterns, utilizing antenna spacing that can be various amounts (not limited to a half-wavelength) and allowing for use of a large difference in frequency between the antenna elements within one transmission scheme. Use of three or more antenna elements provides main lobe patterns with more separation between the main lobes than offered by only two antenna elements. Use of 3+ transmitter elements is particularly suited to substantially linear increases of frequency across a row of typically equally spaced transmitter elements; however, it is preferable to keep the range of frequencies to no more than 10% of the minimum frequency, in order to achieve well defined transmission patterns in the far field.

A variation of a spiral may be achieved by applying a modest non-linearity to the variation of frequencies along the sequence of antenna elements. This causes the spiral form to be strongly evident at a smaller angles in a particular direction (e.g. forwards), and less evident or non-evident at large angles (at least for a short period of time, which may be sufficient). This is illustrated above in FIG. 23.

Another alternative is to turn the transmission off (i.e., turn the amplifier off) whenever the spiral transmission pattern is being generated at wide angles, and turn it on whenever the spiral transmission pattern sweeps through the forward direction). A third approach (which is equally applicable to other transmission patterns too) is to block the transmission at wide angles e.g. using absorbing baffles.

An example of an alternative transmission pattern is a circular pattern. This can be achieved by providing one, some, or all of the antenna elements with two very similar frequencies (each pair differing by the same difference) such that they alternately constructively interfere and destructively interfere. If this approach is applied in a transmission scheme that also produces a spiral transmission pattern then the transmission scheme has two transmission patterns, and these will be distinguishable provided that they repeat at different frequencies, preferably very different frequencies. As an alternative, the transmitter (e.g. the amplifier) may be turned on and off, to provide a circular concentric pattern, provided that the transmitter is arranged to provide a dense arrangement of constructive interference across all relevant azimuthal angles when the transmitter is turned on. This can be achieved by using two antenna elements with a spacing that is many multiples (e.g. 5+ or 20+) of their highest frequency.

As a third alternative transmission pattern may include arbitrarily chosen frequencies provided that the frequencies are chosen such that their wavelengths are divisible into a common multiple. This produces a transmission pattern with pseudo-chaotic but regularly repeating and deterministic transmission pattern. If the transmission pattern has a number of clearly identifiable predetermined hotspots of constructive interference then the timing of a returned signal enables the location of the object to be constrained to a corresponding number of possible locations. If this information is combined with information based on many different transmission patterns, then the location of the object can be ascertained. However, use of pseudo-chaotic patterns is more challenging. See FIG. 18 above for an example of a transmission scheme showing a pseudo-chaotic transmission pattern.

Other patterns are also possible. A requirement is to have a repeating transmission pattern, and within it there is one or more regions of constructive interference and one or more region of destructive interference. A useful and desirable property is that for a given azimuth there is constructive interference at one range within the transmission pattern repeat section.

It is useful to limit the azimuth field of view of the transmitter, receiver or both, since accuracy of detection is lower further to either side of the forward direction of the sequence of transmitter elements (e.g. using blocking baffles). A rear blocking element (e.g. a back plane) is in general useful for constraining a transmission scheme's transmissions to a forward direction (blocking the rear direction).

In some embodiments, the transmission patterns may include two transmission patterns that: are spiral, have equal sweep frequencies, have opposite sweep directions, and are transmitted by respective transmission schemes. This is an example of a 'matched pair' implemented via spiral transmission patterns. A matched pair has the advantage that a computer processor may more readily determine unambiguous azimuth. Optionally, at least three, preferably at least five transmission patterns may be arranged in matched pairs. Transmission patterns that are matched pairs should not be transmitted in the same transmission scheme, thus a matched pair requires two transmission schemes. See FIGS. 21A-C above for an illustration of 6 transmission schemes arranged into 3 matched pairs.

One way to achieve a matched pair is for one transmission scheme to exhibit a repeating spiral transmission pattern (i.e. a half-spiral) with sweep frequency X, and a second transmission scheme to exhibit a circular repeating transmission pattern (i.e. time-varying azimuth-independent variation in amplitude or phase or polarisation) that also repeats at the same frequency X. The timing of a signal returned as a result of each pattern constrains the possible locations of the object to a series of arcs, and by identifying the intersection of the arcs it is possible to determine that the object is at one of a series of points. Because the two sets of arcs are at the same spacing, this series of points will lie in a line, at various ranges but all at the same azimuth. This enables the azimuth of the object to be determined (subject to signal to noise and clutter etc).

In some embodiments, the CW-FDA Detector may be arranged to generate a third transmission pattern (preferably at least 6, optionally at least 30). Again, each transmission pattern may be produced by its own transmission scheme. Use of additional different transmission patterns helps improve detection of unambiguous range and/or azimuth (in typical embodiments, both).

In some embodiments, the field of view may be a 2D azimuthal and elevation field of view, and the transmitter array, and each sequence of transmitter elements may be two dimensional; the transmission patterns may all be different from each other within a 2D field of view; the transmission patterns may exhibit sufficient diversity with respect to the 2D field of view, that this, along with the timing of returned signals attributable to each transmission pattern, jointly provides sufficient information to determine at least the angle or location of the object; and a computing device may be adapted to determine unambiguous azimuth and elevation of an object.

A 2D equivalent of a circular field of view is spherical. Pseudo-chaotic is 2D pseudo-chaotic. Transmission patterns with these shapes are relatively easy to produce. A 2D equivalent of a spiral transmission pattern is a pattern that repeatedly sweeps in azimuth at one frequency and in elevation at a different frequency. This may be achieved by selecting a 2D sequence of transmitter elements (e.g. square grid) and applying a variation in frequency across which is the sum of a linear increase in one dimension, and a different rate of linear increase in the other dimension. The difference in the two sweep frequencies (and consequently the difference in the rates of linear increase in signal frequency in the two dimensions) may be a round number multiple. The difference in sweep frequencies may be at least 3, and preferably at least 50.

In 2D, rather than just matched pairs of transmission schemes, it is advantageous to provide matched quadruplets of transmission schemes. E.g. the 1st and 2nd having equal frequency but opposite direction sweep paths in one dimensions compared to the 3rd and 4th, and the 1st and 3rd being equal and opposite in the other dimension compared to the 2nd and 4th.

As an alternative, angle and azimuth may be determined by performing one transmission scheme, which exhibits angular variation in azimuth (e.g. a spiral), and performing another transmission scheme which exhibits angular variation in elevation (e.g. again a spiral) and combining the results to infer the location of the object. This is more simple for a single object, but would be more computationally processing intensive if there were many objects/clutter since additional transmission schemes would be needed which exhibit variation (e.g. a spiral) with respect to intermediate angle (e.g. one could be at 45 degrees to the azimuth-range plane and at 45 degrees to the elevation-range plane, etc.).

The technique described herein is more accurate within a forward field of view of about 60 to 120 degrees. In some embodiments, rearward transmission from a linear sequence of transmitters may be permitted (by not blocking it) or indeed in all directions that are perpendicular to the line of transmitters. However, this may cause difficulties distinguishing whether an object is in front or behind etc., so generally a field of view is limited to a particular forwards direction.

That said it is possible to change the field of view, to use two, several, or many. The process described is repeated in respect of each field of view. Rather than rotate the transmitter (or receiver) a different selection of transmitter elements may be used in some embodiments to establish a different field of view. The fields of view are typically overlapping, e.g. to form a line or band around 360 degrees, or optionally to cover all directions. This assists in gathering information about objects in a wider range of directions.

Transmission patterns may be reversed with respect to azimuth (e.g. opposite sweep directions). This facilitates detection of the angle of objects. They may be rotated with respect to each other, so as to have different forward directions (e.g. so in the case of spirals they have differing starting and end points of their sweep path), but overlapping across the azimuthal field of view. This has the added benefit of helping set up multiple overlapping fields of view so as to create a wider combined field of view.

They may have different repeat frequencies. In the case of spirals, this means different sweep frequencies. This has the advantage of helping determine the range of objects especially improving range-accuracy and facilitating detection at greater ranges. With a circular transmission pattern the equivalent approach is for the alternating azimuth-independent constructive/destructive interference to occur at different frequencies.

Use of randomly or arbitrarily chosen frequencies to generate different pseudo-random regularly transmission patterns, for example randomly rearranging the frequencies on respective transmitter elements, generally creates a very different transmission pattern. They may have differing form, for example one can be a spiral and the other a circle, or one can be a single thread spiral and the other can be a multithread spiral. Multithreaded spirals may be achieved using two antenna elements, especially by spacing them more than a half-wavelength apart.

Examples of suitable transmitter arrays include a grid, such as a square/rectangular/rhombic grid, or a loop (such as a circle or oval, or a triangle, square, pentagon, hexagon, optionally with rounded sides, and optionally with gaps in the loop or a "plus" shape). To adjust for the transmitter elements not being arranged in a straight line corresponding to a desired forward view direction, phase differences can be added or subtracted to accommodate positional variation in front of or behind a notional line in that direction.

More generally, in any embodiment, each sequence of transmitter elements may deviate from a notional straight line, and each such transmitter element (those that deviate from that line with respect to a forward direction) may be provided with a phase adjustment, such as to compensate for that deviation. The phase adjustment may be by means of electronic phase adjustment, or may be by means of selecting or adjusting a length of a waveguide for providing that frequency to that transmitter element. Indeed, according to an exemplary embodiment each sequence may be arranged in an arc. This can be useful for attaching the CW-FDA detector onto another object, such as the front of a vehicle, and it may be useful to enable use of a circular transmitter array.

The arc may be a shallow arc (less variation in the forward direction than the distance of a single wavelength of a frequency band of the CW-FDA Detector). This enables placement on non-flat surfaces, such as the front or side of a vehicle, such as on a vehicle bumper, which facilitates the use of the detector on a vehicle.

In some embodiments, the array may be distributed around (or alternatively, part way around, e.g. at least one third of the way around, or at least half way around) a central wave energy blocking element, and the difference in the fields of view of the transmission schemes may be achieved by selecting respectively different selections of the transmitter elements. This has the advantage that a wider field of view is possible while avoiding false detections due to transmissions in the rear direction (of each transmission scheme).

In some embodiments, the array may have discrete rotational symmetry (generally, the symmetry is about an axis corresponding to the location of a central blocking element, if there is one) of order n, where n is at least 3, and where at least three of the transmission schemes have respective selections of transmitter elements that are respective rotations of one another (according to that same discrete rotational symmetry). This has the advantage of enabling selections to be more easily made for transmitting in directions having forward directions that differ by between 120 degrees and 360 degrees.

In some embodiments, an exemplary type of transmission pattern may be the spiral (generally this means a half-spiral form, since it is spiral when the forward direction is considered; however, if allowed to propagate backward would generate a mirror image of the forward pattern). A spiral shape has a sweep frequency, meaning the frequency with which it sweeps across a field of view. In the case of double spirals and triple spirals etc. that may be formed using only two transmitter elements, the field of view may be constrained so that at a particular range there is only one spiral. Alternatively, the sweep frequency may be taken to be the frequency that the pattern repeats.

In some embodiments, at least three of the transmission schemes may all have different sweep frequencies, at least six transmission schemes, more preferably at least ten transmission schemes, or at least 20 transmission schemes. The more sweep frequencies used, the easier it is to accurately determine the range of the object, especially enabling detection at greater ranges.

Preferably those transmission schemes (or matched pairs thereof) having different sweep frequencies, have their sweep frequencies distributed across a range, and the density of sweep frequencies is higher at a lower end of the range, as compared to at a higher end of the range. This provides for a more optimal use of computational resources, as compared to a linear distribution or an exponential distribution, since it provides similar amounts of information regarding the distribution of objects at each scale.

Particularly, the sweep frequencies of the transmission schemes (or matched pairs thereof) may be distributed substantially according to an exponential series, where, in some embodiments, the exponent is preferably in the range 1.01 to 10, and in other embodiments, in the range 1.1 to 5. The exponent is preferably a prime number, optionally 2.0.

The range of sweep frequencies can usefully span at least a factor of 10, more preferably at least 50. This enables greater accuracy of determining the range of the object(s) over a greater distance range; however, greater accuracy and range requires greater processing power. Therefore, for portable or low power applications (such as small drones, room navigating robots, etc.), the range is advantageously less than 20, and for high power applications (self driving/autonomous automobiles and large drones) preferably more than 20.

If there are at least three transmitter elements in each sequence there can be a linear increasing function in frequency along the sequence. This provides for reduced complexity of computational processing by the processor, by providing a clearer lobe and sidelobe pattern; however, it is also possible to implement a non-linear function, which adds additional complexity to the sweep paths (which is both useful and more computationally demanding). One reason can be for positioning the transmitter on a surface, which does not suit equal spacing of transmitter elements.

All of the frequencies may be generated (e.g. indirectly via frequency multipliers) from a single frequency generator. This helps ensure the transmission schemes are generated coherently, which is important for good quality results. Alternatively, each transmission scheme may have its own frequency generator and optionally each transmitter may have its own frequency generator. This latter option is more attractive for sonic transmission since frequency generators within the range of typical sonic frequencies are less challenging to implement.

Generally each transmission scheme operates for a period of time to provide repetitions of the transmission pattern, generally at least 2, optionally at least 100, to enhance the signal to noise ratio.

As with conventional radar techniques, a Doppler shift in returned signal can be measured (i.e. in the carrier frequency). This identifies the component of relative velocity of the object with respect strictly to the range direction (i.e. exactly the radial direction). This can be useful since if there are multiple objects and they all have different Doppler shifts. This enables them to be distinguished, reducing the problem to identifying the angle, range, or location of one object, and repeating this for each object.

In some embodiments, the CW-FDA detector may be arranged to selectively operate in either of at least two modes, each mode providing transmission schemes that have sweep frequencies that span a respective range of sweep frequencies, where the ranges are different, overlapping ranges. Higher sweep frequencies are more suitable for shorter range but more accurate detection. Accordingly, this has the advantage of enabling the detector to switch between short range detection with high range resolution, to long range detection with lower range-resolution, according to situation.

Optionally, in other embodiments, the CW-FDA detector may be arranged to switch from a higher range mode to lower range mode in response to detecting an object within the lower range. Optionally, the CW-FDA detector may be arranged to switch mode according to a user input.

Many applications are possible, such as, a detector on an autonomous vehicle, which has the advantage of reducing the cost of the vehicle compared to using a pulsed detector. Additional examples of applications as a radar detector may also include:

On an automobile, such as a self-driving/autonomous automobile.
On an aircraft or aerial drone (such as a quad or multicopter drone).
On a boat or ship or above water drone.
On a spacecraft or satellite.
On a ground based radar facility.
Examples of applications as a sonic detector may include:
On a robot suitable for navigating indoors.
On a boat or ship or buoyant drone.
On a submarine or a submersible drone.
In a medical or engineering scanner (ultrasound).
In an underground detector (low frequency sound waves).

An exemplary embodiment may use spiral transmission patterns via separate respective transmission schemes in differing frequency bands or alternating time periods, and may use a wide field of view, horn receiver that is isolated from the transmitter. There are many different spiral transmission patterns, having sweep frequencies that are in matched pairs, and the matched pairs are spread out in a distributed fashion across a range of frequencies, in particular having a logarithmic variation in the distribution of the sweep frequencies.

Carrier frequencies of 1 GHz, 2.4 GHz or 5.2 GHz may be used, and frequencies of the matched pairs may be as follows: 1 kHz, 2 kHz, 4.5 kHz, 10 kHz, 20 kHz, 45 kHz, 100 kHz, 200 kHz, 450 kHz, 1000 kHz, 2000 kHz, 4500 kHz, 1 MHz, 2 MHz, 4.5 MHz, 10, MHz, 20 MHz, 45 MHz. The maximum span of frequencies applied to the transmitter elements in any transmission scheme may be less than 30% of their maximum value, preferably less than 10%.

From the responses, it is possible to determine (to a particular accuracy, depending on the circumstances), the positions of objects in a field of view and a range of interest. The maximum range that objects can be unambiguously located within is dependent on the number and range of sweep frequencies, and the data processing step. The maximum distance resolution is around a half or, depending on the number of transmitter elements, a smaller fraction, of the range variation between sweep paths at the highest sweep frequency.

For example with radio waves, in the above example, the slowest sweep frequency has a cycle of ~1/1000 s, which in air travels, ~300,000,000 m/s, giving a nominal range that is equal to ~300,000 m (but potentially a multiple of this since it is not strictly necessary for the slowest sweep to perform only one sweep in the range). The fastest sweep frequency (45 MHz) has a range separation between main lobe sweep paths, of ~7 m, giving a maximum resolution that at least ~3.5 m (potentially higher, depending on the number of transmitter elements used). Of course there will be additional limiting factors on range and resolution such as transmission strength and time, as well as clutter and measurement accuracy. Note that range resolution is generally limited at higher frequencies by the sampling rate of the analog to digital converter used.

As a second example (e.g. using sonic waves with a carrier wave frequency of 200 kHz), a set of pairs of transmission schemes may be arranged so the pairs have sweep frequencies as follows: 100 Hz, 200 Hz, 450 Hz, 1 kHz, 2 kHz, 4.5 kHz, 10 kHz, 20 kHz. In this example, the range would be equal to, or some multiple of 3 m, with a potential range resolution of 1.5 cm.

Additional examples are shown above in the tables in FIGS. 15A-C and 16A-C. These are merely illustrative examples. For radar applications, it is advantageous to make use of the 2.4 GHz or 5 GHz radio frequency bands, in which affordable transmitters are readily available (particularly where unlicensed use is possible), especially the 5 GHz band since this enables the transmitter to be smaller. Embodiments in the range of modes 4-10 could be more easily implemented using the 2.4 GHz band, however this requires a larger transmitter.

The table in FIGS. 15A-C shows that a number of useful ranges and range-resolutions are possible using carrier frequencies in the range of at least 5 GHz to 35 GHz. Examples are given in the X-Band (8-12 GHz), K band (18-26.5 GHz), Ka Band (26.5-40 GHz), Ka Band (26.5-40 GHz), as well as the 5 GHz band (e.g. unlicensed spectrum). Frequencies from 40 GHz to 100 GHz could also be used for increased resolution.

The examples using the 5 GHz band, including modes 1 to 4 would be useful for many applications, such as autonomous automobiles. Modes 8 to 10 are particularly useful as radars for spacecraft. A radar for a cube-sat is envisaged, having either a three element 5 GHz transmit antenna arranged within/on the cube-sat, or a larger antenna arranged to fold or extend out from the cube-sat. Another example is modes 3 to 5, especially using low power mode, being particularly suitable for use on a small aerial drone. Another example is modes 1 to 3 being especially useful for a robot designed to navigate a terrain. Another example is modes 4 to 7 being especially useful for a radar for a marine vessel. Note that modes 1 to 3 require a higher carrier frequency than 5 GHz and so currently could be expected to cost more, however they offer potentially greater range-resolution at useful ranges.

Note that modes 1 to 10 are just examples. Low power modes are exemplified as having a lower ratio of range to range-resolution (in each case a ratio of 100), while high power modes are also exemplified, having a higher ratio of range to range-resolution (in each case a ratio of 20 to 510). Again these are examples taken from a continuum of embodiments. Higher ratios of range to range-resolution, and also lower ratios are readily implemented using the examples in the tables in FIGS. 15A-C or 16A-C as starting points.

Turning to the table in FIGS. 16A-C, seven example embodiments are shown, the first two being specific radar embodiments, and the latter five relying on sonic wave energy rather than radio wave energy.

In the first example, the 2.4 GHz unlicensed band is used, and a 4 m range resolution is possible, which can (subject to sufficient transmitter elements, sufficient transmission schemes, and sufficient signal-to-noise ratio) be exceeded (for example by a factor of 5 as shown—to achieve 5 cm range-resolution).

In the second example a lower carrier frequency is used to transmit at 30 MHz, enabling over the horizon radar to be performed, in this case to a distance of 60 km (subject to power output and signal to noise ratio achieved). A larger array of transmitter elements should be used, (for example 15 m to 40 m or longer).

In the next five embodiments the transmitter is an array of sonic transmitters (loudspeakers, piezo-electric transmitters, vibrating transducers, etc.), rather than being a radio transmitter antenna element.

The first sonic wave embodiment exemplified, uses an ultrasonic carrier wave which is only weakly attenuated in air (e.g. 40,000 Hz or more, or as shown; 80,000 Hz), to enable detection of nearby objects through air. The example application given is a detector for detecting objects in a room, although this is equally applicable to outdoors navigation. This detector is more suitable for collision avoidance of slower robots, since the lower speed of sound waves compared to radio waves means that it takes more time to gather echoes from objects to detect them. In the examples given, the maximum sweep frequency used is less than the carrier frequency, preferably by a ratio of at least 10 (as is shown in the tables in FIGS. 15A-C and 16A-C).

However, since it is challenging to work with very high frequency sonic waves (e.g. due to attenuation of high frequencies), and higher sweep frequencies are needed in order to achieve high range-resolution, this means that it may be appropriate to use a maximum sweep rate that is around 10 to 20 times slower than the carrier frequency, whereas with radar it can often be convenient to use a sweep rate that is in the range of 20 to 100,000 times slower than the carrier frequency. As shown in the examples in the table in FIGS. 16A-C, the maximum sweep rate is around 10 for sonic CW-FDA devices.

It should be noted that the nominal range assumes that the designer chooses to set a range of the device equal to the distance that the transmission travels during one sweep of the main lobe, at the lowest used sweep frequency. As an alternative approach, a higher range may also be achieved very straightforwardly, by comparing the returned signals from multiple transmission schemes such as to identify objects that are beyond that range.

Furthermore, the table gives the nominal range-resolution of the detector, as equal to the transmission velocity divided by the maximum sweep frequency. However, with large numbers of transmit elements used in the transmitter array, it is possible to make the main lobe of the transmission very narrow relative to the distance between main lobe paths (the distance at any given time). Using this approach, subject to acceptable signal-to-noise ratio and other factors that can affect detection accuracy, it may be easy to exceed the notional resolution given. The table shows a further row 'enhanced resolution' showing the resolution achieved if the resolution was a fifth of the distance between consecutive main lobes.

Turning to the second sonic example in the table in FIGS. 16A-C, the transmission carrier frequency is, in this example, 5 MHz, and the transmission speed through living tissue is approximately 1500 m/s. To achieve a high range-resolution requires the transmitter elements to be very close together; however, subject to this constraint, using a carrier frequency of 5 MHz, and a range of sweep frequencies up to 500,000 Hz, a nominal range-resolution of 0.3 cm is possible (and a higher resolution is possible such as 0.06 cm is possible using an array with many transmitter elements, e.g. at least 8).

Turning to the third sonic example in the table in FIGS. 16A-C, an ultrasonic detector example is given using 10 MHz ultrasound, suitable to detect cracks or other objects/defects in a solid such as steel or aluminum. Again, this requires a miniaturized array of ultrasound transducers, which preferably are piezoelectric transducers.

Turning to the fourth sonic example in the table in FIGS. 16A-C, a sonic underground detector is exemplified, using an audible carrier frequency of 20 kHz, and a range of sweeping frequencies from 50 to 2000 per second. Subject to the transmission of the sonic waves through rock, and adequate signal to noise ratio returned to the receiver, this enables detection up to 80 m range at a nominal range-resolution of 2 m (but potentially higher, for example 0.4 m). Compared to traditional techniques which rely on a pulse (such as a controlled explosion) the approach described here uses a continuous wave transmission, and although this may be weaker, it can be operated continuously, until sufficient signals are received back that the signals (when summed) provide a stronger signal to noise ratio. Thus, it provides a potentially cheaper and less destructive approach to detecting objects, and this applies to all of the examples, not just to sonic or underground detection. This approach would also be suitable for an underwater detector, albeit with a different transmission velocity and thus different range-resolution.

Turning to the fifth sonic example in the table in FIGS. 16A-C, an underground sensor is described in this case as an active seismic sensor, since it uses a lower carrier frequency (5 kHz) and lower sweep frequencies (1-500 Hz) to detect object (subject to propagation and signal-to-noise ratio) up to 4 km underground at a nominal resolution of 8 m (or enhanced resolution of for example 2 m). This requires a larger transmitter array –1.2 m or 3.2 m or larger.

Note that for many sonic transmitter embodiments and applications, the ratio of the maximum sweep frequency to the carrier frequency is advantageously around 0.1 (providing maximum range-resolution), whereas for most radar embodiments, particularly those using a carrier frequency of between 2.4 and 5.8 GHz, the ratio of the maximum sweep frequency to the carrier frequency is advantageously less than 0.10, typically in the range of 0.05 or less.

For applications where processing power is limited, the ratio of range to range-resolution is preferably between 20 and 250. For applications where more processing power is available, the ratio of range to range-resolution is preferably between 200 and 1000.

In some embodiments, the detector may be adapted to operate in one of a plurality of modes, where the modes differ in the range of sweeping frequencies of the transmission schemes used to detect objects. For example a detector on a cube-sat might usefully switch between any of modes 3 to 10 (for example in low power) depending on the range of interest. Similarly, a detector on an autonomous vehicle might alternately operate in modes 1, 2, 3 (using a carrier frequency of, for example, 20 GHz in all three cases), while a large drone might operate alternately in modes 3 to 8, or a marine vessel might switch between modes 4 to 6. The choice of which mode to operate in might be automatic, or might be left to a user to select, as needed.

The same is true for applications using sonic energy. For example the room navigation sensor shown in the table in FIGS. 16A-C might vary the range of sweep frequencies used, from those shown, either upwards by a factor of, for example 5 or 10, or downwards by a factor of, for example 5 or 10. This allows the sensor to detect closer objects at high range-resolution accuracy, and further objects at lower range-resolution accuracy. Indeed, the device might alternate between these two or three modes, and combine the results into a single output. Again, the same is true with a detector for medical imaging or engineering ultrasound detection, and underground detection. The range can be traded for range-resolution, as required by an operator, depending on the depth of the area that needs to be imaged.

One difference is that with sonic detectors, the time required to gather sufficient signals to determine the locations of objects, is more likely to be a factor affecting the choice of whether to use multiple ranges, as compared to use in radar where the signals travel far faster. Therefore a radar device preferably automatically performed measurements at different ranges and different range-resolutions (each selection requiring two, three, or typically many, transmission schemes), and combines the results of each measurement, into a combined output. Whereas with sonic detectors, although this is a useful option, typically the device does not perform detection in multiple ranges and combine the results into an output, without being controlled based on a user selection, of whether or not to do so. Instead with sonic detectors it would be more appropriate for the device to accept a user selection of the desired range and range resolution to detect over.

There are a large number of transmission schemes, with similar numbers having positive sweep direction and having negative sweep direction, with the sweep frequencies spread out substantially logarithmically—e.g. each having a sweep frequency greater than the previous by a similar factor. For example, each positive sweep direction scheme may have a sweep frequency that is 1.3× faster than the previous. The same approach may also be applicable for the negative sweep directions schemes.

Each scheme provides a map of where objects might be. The data may be processed by searching for objects in a short range, using the fastest sweeping matched pairs (e.g. the fastest 10 positive sweeping schemes, and the fastest 10 negative sweeping schemes). High granularity is suited to high sweep frequencies. One way to identify objects is to plot the possible locations (the various paths of the main lobe of the transmission signal) of objects suggested by the results of each transmit, and find those locations (parts of paths) where substantially all of the schemes suggest there could be an object. Having identified the position of an object, it is then preferable to remove information about possible locations that are now known to be incorrect (the relevant remainders of the paths) to the extent appropriate (i.e. reduce the strength of the remainders of those paths rather than removing the paths entirely).

Having completed this process for the short range region (or alternatively the long range region), it is possible to continue to examine a greater region, using the improved information on the locations of objects to help find additional objects. This can be repeated until the whole field of view and range has been evaluated. Alternatively, it may be more processor efficient to compare the returned data from all of the transmission schemes, across the whole field of view and range, at once.

Another improvement, which may increase data processor efficiency, is to remap the range of interest according to a transformation in which the long range is compressed lengthwise and also widthwise, compared to the short range. For example the field of view, being a circular sector in Cartesian coordinates, may be rearranged as a rectangle with angle vs range as axes and the distance may be plotted logarithmically.

The outputs (traces of possible locations of objects) from the schemes with slowest sweep frequencies are plotted across the full range, whereas the schemes with highest sweep frequencies are plotted across the full field of view, but only across part of the range. The higher the sweep frequency, the less of the range that the results of that scheme are plotted across. This is because the long range part of the map has lower resolution (both in terms of distance across the field of view, and distance along the range), and high frequency sweep traces become difficult or impossible to plot accurately. More generally, it is possible to plot them across the whole range, however due to resolution constraints, details of the high frequency traces may become lost in the granularity of the map at the far end of the range.

Having plotted each trace across the remapped field of view, it is possible to combine the traces at each location from multiple or many schemes, for example by multiplying their values across the map. The locations where objects are located are revealed as these locations have traces from many or all schemes.

In order to determine the angle to an object in the scene, first the main beam may be scanned clockwise. The return from the target will occur some time $t_{T1}$ after some reference. This could be when the beam is at −90 degrees from boresight for example. This time consists of the time taken for the main beam to rotate to the target bearing $t_{\theta1}$, and the time taken for the energy to propagate to the target and return to the receiver, $t_{R1}$.

The time $t_{T1}=t_{\theta1}+t_{R1}$ is measured at the receiver. Following this measurement, a second scan may be completed at the same scan rate, now in the anti-clockwise direction, this time the total time measured $t_{T2}=t_{\theta2}+t_{R2}$ will be different (providing the target does not lie on boresight), but assuming the object has not moved significantly in range, the only change to the total time is a result of the time taken for the beam to steer to the object.

Mathematically this means $t_{T1}=t_{T2}$, therefore, the difference in measured times is a function of only the time taken to scan to the angle, which is proportional to the angle itself. Therefore, using two scans in opposing directions, it is possible to unambiguously determine the angle to an object.

In the case of Radar measurements, $t_{R1}$ and $t_{R2}$ should be treated as equivalent, since the speed of light is so high compared to the speed of a typical platform, in view of typical ranges of interest. The two way round trip time would only change by an appreciable amount if the target was moving very quickly.

Figure 25:
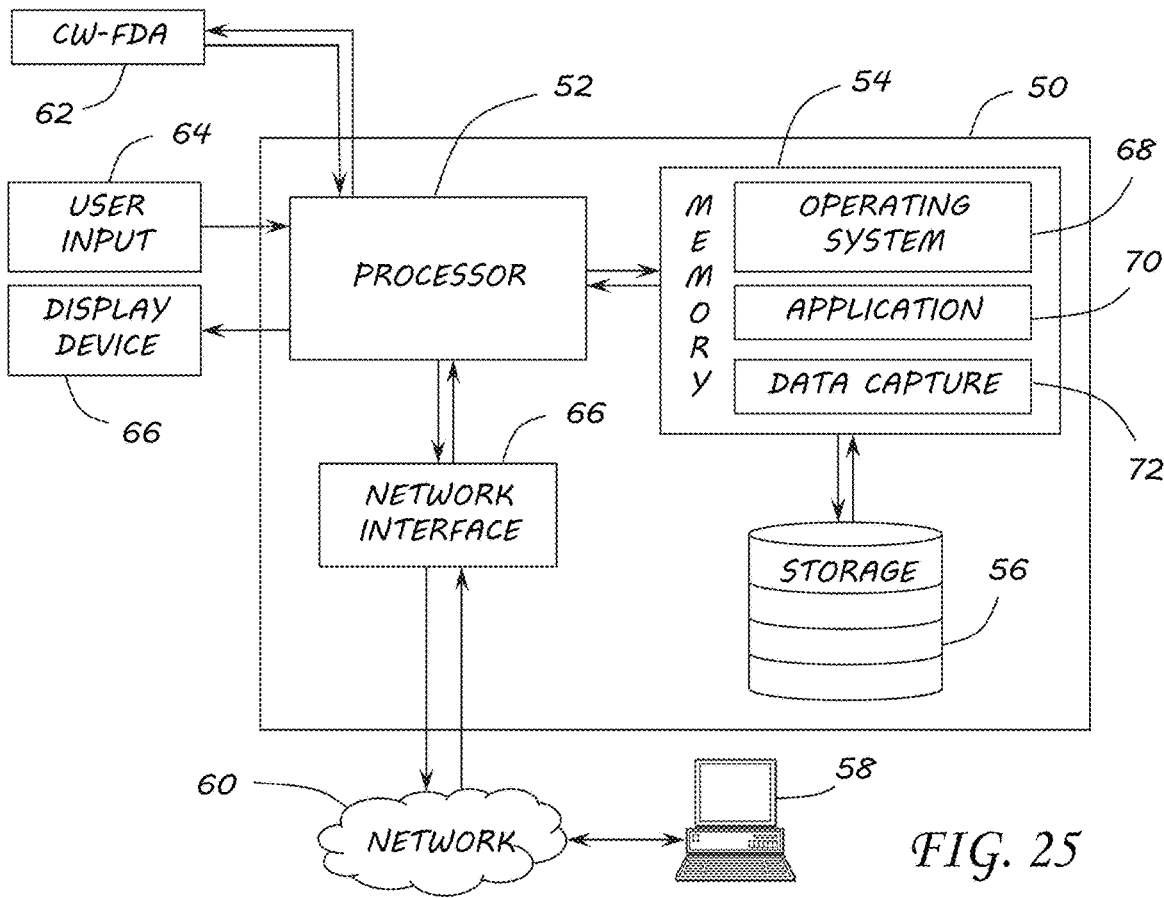
FIG. 25 is an exemplary hardware and software environment for determining and detecting scattering characteristics consistent with embodiments of the invention.

FIG. 25 illustrates an exemplary hardware and software environment for a computing device 50 suitable for performing transmission analysis in a manner consistent with embodiments of the invention. For the purposes of the invention, computing device 50 may represent practically any computer, computer system, or programmable device, e.g., multi-user or single-user computers, desktop computers, portable computers and devices, handheld devices, network devices, mobile phones, etc. Computing device 50 will hereinafter be referred to simply as a "computer."

Computer 50 typically includes at least one processor 52 coupled to a memory 54. Processor 52 may represent one or more processors (e.g. microprocessors), and memory 54 may represent the random access memory (RAM) devices comprising the main storage of computer 50, as well as any supplemental levels of memory, e.g., cache memories, non-volatile or backup memories (e.g. programmable or flash memories), read-only memories, etc. In addition, memory 54 may be considered to include memory storage physically located elsewhere in computer 50, e.g., any cache memory in a processor 46, as well as any storage capacity used as a virtual memory, e.g., as stored on a mass storage device 56 or another computer 58 coupled to computer 50 via a network 60 or other means. The mass storage device 56 may contain a cache or other dataspace, which may be used to store and manipulate transmissions received CW-FDA 62 or the like.

Computer 50 also typically receives a number of inputs and outputs for communicating information externally. For interface with a user or operator, computer 50 typically includes one or more user input devices 6 (e.g., a keyboard, a mouse, a trackball, a joystick, a touchpad, touch screen, a keypad, a stylus, and/or a microphone, among others). Computer 50 may also include a display 66 (e.g., an LCD display panel, touchscreen, and/or a speaker, among others). The interface to computer 50 may also be through an external device connected directly or remotely to computer 50, or through another computer 58 communicating with computer 50 via a network 60 or other type of high speed communications device.

Computer 50 operates under the control of an operating system 68, and executes or otherwise relies upon various computer software applications, components, programs, objects, modules, data structures, etc. (e.g. Application 70 and Data Capture 72). The Application 62, for example, may analyze captured transmission data to determine a position of an object. Computer 50 communicates on the network 60 through a network interface 74.

In general, the routines executed to implement the embodiments of the invention, whether implemented as part of an operating system or a specific application, component, program, object, module or sequence of instructions will be referred to herein as "computer program code", or simply "program code." The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to non-transitory physical, recordable type media such as volatile and non-volatile memory devices, floppy and other removable disks, hard disk drives, optical disks (e.g., CD-ROM's, DVD's, etc.), among others; and transmission type media such as digital and analog communication links.

In addition, various program code described above may be identified based upon the application or software component within which it is implemented in specific embodiments of the invention. However, it should be appreciated that any particular program nomenclature presented is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality.

Those skilled in the art will recognize that the exemplary environment illustrated in FIG. 25 is not intended to limit the present invention. Indeed, those skilled in the art will recognize that other alternative hardware and/or software environments may be used without departing from the scope of the invention.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A continuous wave radio or sonic frequency diverse array (CW-FDA) detector for determining an unambiguous range of a reflective object within a range and field of view of interest, the detector comprising:
 a continuous wave radio or sonic frequency diverse array (CW-FDA) transmitter, including:
  a frequency generator; and
  an array of transmitter elements;
 a continuous wave radio or sonic frequency diverse array (CW-FDA) receiver, including:
  a receiver configured to receive returned signals reflected from the reflective object resulting from a transmission by the CW-FDA transmitter across at least part of the field of view of interest;
 a computing device configured to receive returned signal data from the CW-FDA receiver;
 the CW-FDA transmitter configured to operate according to a first transmission scheme, the first transmission scheme including:
  the frequency generator configured to provide at least two transmitter elements of the array of transmitter elements with signals of respectively different frequency;
  wherein the differing frequency signals are of a substantially continuous wave; and
  wherein a spacing of the at least two transmitter elements and the frequencies provided thereto are such to generate a first transmission pattern,
 the first transmission pattern including:
  a transmission pattern exhibiting a deterministic pattern of constructive interference repeating in range; and
  a first feature attributable to the first transmission pattern, the first feature selected from a group consisting of a frequency, a timing, a polarization, a shape and combinations thereof,
  wherein within each repeat in the range, the transmission pattern includes areas of constructed interference distributed in azimuth or range, such that a timing of returned signals results from reflection of the transmission pattern by the reflective object and provides a constraint on possible values of the range;

the CW-FDA transmitter further configured to operate according to a second transmission scheme, the second transmission scheme generating a second transmission pattern different from the first transmission pattern and having a second feature attributable to the second transmission pattern, the second feature selected from a group consisting of a frequency, a timing, a polarization, a shape and combinations thereof, the first and second transmission patterns exhibiting a spatial diversity of constructive interference compared to the other of the first and second transmission patterns;

the CW-FDA receiver configured to receive signals of the first and second transmission patterns, each signal resulting from each of the first and second transmission patterns, wherein a timing of attributable returned signals enables unambiguous determination of the range of the reflective object, and wherein the computing device is configured to attribute each received signal to its respective transmission pattern based on the first and second features, and wherein the computing device is further configured to unambiguously determine range of the reflective object based at least on the timing of the attributed returned signals.

2. The CW-FDA detector of claim 1, wherein the CW-FDA detector is a radar detector, the CW-FDA detector configured such that:
the CW-FDA transmitter is configured to transmit radio wave signals; and
the CW-FDA receiver is configured to receive returned radio wave signals.

3. The CW-FDA detector of claim 1, wherein the CW-FDA detector is a sonic detector, the CW-FDA detector configured such that:
the CW-FDA transmitter is configured to transmit sonic wave signals; and
the CW-FDA receiver is configured to receive returned sonic wave signals.

4. The CW-FDA detector of claim 1, wherein the CW-FDA receiver is a fixed geometry receiver.

5. The CW-FDA detector of claim 1, wherein the first and second transmission schemes are generated in differing frequency bands.

6. The CW-FDA detector of claim 1, wherein the first and second transmission schemes are generated in differing time periods.

7. The CW-FDA detector of claim 1, wherein the at least two transmitter elements of the array of transmitter elements for the first transmission scheme are different transmitter elements of the array of transmitter elements than for the second transmission scheme.

8. The CW-FDA detector of claim 1, wherein at least one of the first and second transmission patterns is a spiral pattern.

9. The CW-FDA detector of claim 1, wherein the first and second transmission patterns have a same repeat frequency, and the CW-FDA detector is configured to determine an unambiguous azimuth of the reflective object.

10. The CW-FDA detector of claim 1, wherein the first and second transmission patterns have different repeat frequencies.

11. The CW-FDA detector of claim 1, wherein either the first or second transmission pattern exhibits at least two different, distinguishable repeating transmission patterns.

12. The CW-FDA detector of claim 1, wherein the transmitter comprises a two-dimensional (2D) array of transmitter elements.

13. The CW-FDA detector of claim 1, further comprising:
the CW-FDA transmitter further configured to operate according to a third transmission scheme, the third transmission scheme generating a third transmission pattern different from the first and second transmission patterns.

14. A continuous wave radio or sonic frequency diverse array (CW-FDA) transmitter for transmitting signals toward a reflective object within a range and field of view of interest, the transmitter comprising:
a frequency generator; and
an array of transmitter elements;
the CW-FDA transmitter configured to operate according to a first transmission scheme, the first transmission scheme including:
the frequency generator configured to provide at least two transmitter elements of the array of transmitter elements with signals of respectively different frequency;
wherein the differing frequency signals are of a substantially continuous wave; and
wherein a spacing of the at least two transmitter elements and the frequencies provided thereto are such to generate a first transmission pattern, the first transmission pattern including:
a transmission pattern exhibiting a deterministic pattern of constructive interference repeating in range; and
a first feature attributable to the first transmission pattern, the first feature selected from a group consisting of a frequency, a timing, a polarization, a shape and combinations thereof,
wherein within each repeat in the range, the transmission pattern includes areas of constructed interference distributed in azimuth or range, such that a timing of returned signals results from reflection of the transmission pattern by the reflective object and provides a constraint on possible values of the range;
the CW-FDA transmitter further configured to operate according to a second transmission scheme, the second transmission scheme generating a second transmission pattern different from the first transmission pattern and having a second feature attributable to the second transmission pattern, the second feature selected from a group consisting of a frequency, a timing, a polarization, a shape and combinations thereof; and
the CW-FDA transmitter further configured to provide additional transmission patterns each having at least one feature attributable to its respective transmission pattern, the feature of the respective transmission pattern selected from a group consisting of a frequency, a timing, a polarization, a shape and combinations thereof, and each of the first, second, and additional transmission patterns exhibit spatial diversity of constructive interference areas compared to each other to enable a detector to determine the range of the reflective object.

15. The CW-FDA transmitter of claim 14, wherein the CW-FDA transmitter is a radar transmitter configured to transmit radio wave signals.

16. The CW-FDA transmitter of claim 14, wherein the CW-FDA transmitter is a sonic transmitter configured to transmit sonic wave signals.

17. The CW-FDA transmitter of claim 14, wherein the first and second transmission schemes are generated in differing frequency bands.

18. The CW-FDA transmitter of claim 14, wherein the first and second transmission schemes are generated in differing time periods.

19. A continuous wave radio or sonic frequency diverse array (CW-FDA) receiver for determining an unambiguous range of a reflective object within a range and field of view of interest from received signals, the receiver comprising:

a receiver configured to receive returned signals reflected from the reflective object resulting from a transmission by a CW-FDA transmitter across at least part of the field of view of interest, wherein the transmission includes at least two transmission schemes having respective transmission patterns, each of the transmission patterns including a feature attributable to the respective transmission pattern, the feature being selected from a group consisting of a frequency, a timing, a polarization, a shape and combinations thereof;

a computing device configured to receive returned signal data from the CW-FDA receiver and attribute the signals to the respective transmission patterns based on their respective attributable features in order to unambiguously determine range of the reflective object based at least on the timing of the attributed returned signals.

20. The CW-FDA receiver of claim 19, wherein the CW-FDA receiver is a radar receiver configured to receive returned radio wave signals.

21. The CW-FDA receiver of claim 19, wherein the CW-FDA receiver is a sonic receiver configured to receive returned sonic wave signals.

22. The CW-FDA receiver of claim 19, wherein the CW-FDA receiver is a fixed geometry receiver.

23. The CW-FDA detector of claim 1, wherein a timing of attributable returned signals enables unambiguous determination of the azimuth of the reflective object, and wherein the computing device is further configured to unambiguously determine azimuth of the reflective object based at least on the timing of the attributed returned signals.

24. The CW-FDA transmitter of claim 14, wherein within each repeat in the range, the transmission pattern includes areas of constructed interference distributed in azimuth or range, such that a timing of returned signals results from reflection of the transmission pattern by the reflective object and provides a constraint on possible values of the azimuth, and wherein the CW-FDA transmitter is further configured to provide the additional transmission patterns each having at least one feature attributable to its respective transmission pattern, and each of the first, second, and additional transmission patterns exhibit spatial diversity of constructive interference areas compared to each other to enable a detector to determine the azimuth of the reflective object.

25. The CW-FDA receiver of claim 19, wherein the computing device is further configured to receive returned signal data from the CW-FDA receiver and attribute the signals to the respective transmission patterns based on their respective attributable features in order to unambiguously determine azimuth of the reflective object based at least on the timing of the attributed returned signals.

* * * * *